US010866836B1

(12) United States Patent
Guo et al.

(10) Patent No.: US 10,866,836 B1
(45) Date of Patent: Dec. 15, 2020

(54) METHOD, APPARATUS, DEVICE AND STORAGE MEDIUM FOR REQUEST SCHEDULING OF HYBRID EDGE COMPUTING

(71) Applicant: Deke Guo, Changsha (CN)

(72) Inventors: Deke Guo, Changsha (CN); Siyuan Gu, Changsha (CN); Jiangfan Li, Changsha (CN); Chendie Yao, Changsha (CN)

(73) Assignee: Deke Guo, Changsha (CN)

( * ) Notice: Subject to any disclaimer, the term of this patent is extended or adjusted under 35 U.S.C. 154(b) by 0 days.

(21) Appl. No.: 16/887,930

(22) Filed: May 29, 2020

(30) Foreign Application Priority Data

Aug. 20, 2019 (CN) .......................... 2019 1 0766489

(51) Int. Cl.
| | | |
|---|---|---|
| G06F 9/50 | (2006.01) |
| H04L 12/751 | (2013.01) |
| H04L 12/26 | (2006.01) |
| G06Q 10/04 | (2012.01) |
| G06F 17/11 | (2006.01) |

(52) U.S. Cl.
CPC ............ *G06F 9/5027* (2013.01); *G06F 17/11* (2013.01); *G06Q 10/04* (2013.01); *H04L 43/0852* (2013.01); *H04L 45/02* (2013.01); *G06F 2209/502* (2013.01); *G06F 2209/503* (2013.01)

(58) Field of Classification Search
CPC .. G06F 9/5027; G06F 17/11; G06F 2209/502; G06F 2209/503; G06Q 10/04; H04L 43/0852; H04L 45/02
See application file for complete search history.

(56) References Cited

U.S. PATENT DOCUMENTS

| | | | | |
|---|---|---|---|---|
| 9,606,964 | B1* | 3/2017 | Anjomshoa | ............. G06F 17/11 |
| 2015/0073188 | A1* | 3/2015 | Floudas | ................ C07C 5/2767 585/332 |
| 2016/0147712 | A1* | 5/2016 | Chiang | ................... G06F 17/11 708/446 |
| 2017/0176959 | A1* | 6/2017 | Vedam | ................. G05B 13/041 |
| 2019/0007258 | A1* | 1/2019 | Surcouf | ................ G06F 9/5083 |
| 2019/0120640 | A1* | 4/2019 | Ho | ......................... G06Q 10/04 |
| 2019/0361452 | A1* | 11/2019 | Tahir | ..................... G01S 13/589 |
| 2020/0252481 | A1* | 8/2020 | Seelam | ................... H04L 41/12 |

* cited by examiner

*Primary Examiner* — Arvin Eskandarnia

(74) *Attorney, Agent, or Firm* — Dragon Sun Law Firm, PC; Jinggao Li. Esq.

(57) ABSTRACT

Provided are a method, an apparatus, and an electronic device for request scheduling of hybrid edge computing, wherein the request scheduling method includes: obtaining situations of a topological structure, computing resources and communication resources of a communication network; determining the number of hybrid edge servers placed in the communication network; dividing a problem of an optimal request scheduling path of the hybrid edge server into sub-problems of Mixed-Integer Non-Linear Programming (MINLP) models according to the situations of the topological structure, the number, the computing resources and the communication resources of the network; establishing the MINLP model according to the sub-problems respectively; converting the MINLP model into a Mixed-Integer Linear Programming (MILP) equation; and solving the MILP equation to obtain a placement node of the hybrid edge server and a target server for processing communication requests. The request scheduling method improves a request scheduling efficiency.

14 Claims, 8 Drawing Sheets

METHOD, APPARATUS, DEVICE AND STORAGE MEDIUM FOR REQUEST SCHEDULING OF HYBRID EDGE COMPUTING

CROSS-REFERENCE TO RELATED APPLICATION

This application claims priority to and the benefit of CN 201910766489.6, filed Aug. 20, 2019. The entire disclosure of the above-identified application is incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present disclosure relates to the technical field of communications, and in particular to a method, an apparatus, a device and a storage medium for request scheduling of hybrid edge computing.

BACKGROUND

With wide use of Internet of Things (IoT) devices and the advent of the 5th generation mobile communication technology (5G), edge computing has become an effective example for serving terminal users and providing better service quality, especially for emerging network services. Existing edge services are usually oriented to the public. However, in some scenarios, there also exist specific user requests, such as those requests involving privacy and security requiring private edge services. This results in a hybrid edge service environment, but there are still no effective measures on how to schedule user requests in the hybrid edge service environment at present.

Therefore, a heretofore unaddressed need exists in the art to address the aforementioned deficiencies and inadequacies.

SUMMARY

In view of this, the present disclosure provides a method, an apparatus, a device and a storage medium for request scheduling of hybrid edge computing. The method may improve a request scheduling efficiency when requirements of a minimum total communication delay and a maximum number of processed communication requests are satisfied.

According to a first aspect of the present disclosure, there is provided a method of request scheduling of hybrid edge computing, including: obtaining circumstances of a topological structure, computing resources and communication resources of a communication network; determining the number of hybrid edge servers placed in the communication network, where the hybrid edge server is a server providing services by using public resources and private resources; dividing a problem of an optimal request scheduling path of the hybrid edge server into sub-problems of Mixed-Integer Non-Linear Programming (MINLP) model according to the circumstances of the topological structure, the number, the computing resources and the communication resources of the network, where the problem of the optimal request scheduling path of the hybrid edge server is used to determine a placement node of the hybrid edge server and a target server for processing communication requests when the requirements of the minimum total communication delay and the maximum number of the processed communication requests in the communication network are satisfied, and the sub-problem includes any of the followings: a sub-problem of sufficient computing resources and sufficient communication resources, a sub-problem of insufficient computing resources and sufficient communication resources, a sub-problem of sufficient computing resources and insufficient communication resources and a sub-problem of insufficient computing resources and insufficient communication resources; establishing the MINLP model according to the sub-problems respectively; converting the MINLP model into a Mixed-Integer Linear Programming (MILP) equation; and solving the MILP equation to obtain the placement node of the hybrid edge server and the target server for processing the communication requests.

Optionally, in a case of the sufficient computing resources and the sufficient communication resources, the MINLP model is established according to the sub-problem as follows:

$$\min \sum_{i=1}^{n} \pi_i \theta_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \leq \lfloor \alpha K \rfloor, \forall x_i = 1$$

$$i, j \in \{1, 2, \ldots, n\}$$

$$\sum_{j=1}^{n} y_{j,i} \leq \lfloor (1-\alpha)K \rfloor, \forall x_i = 1$$

$$\sum_{j=1}^{n} y_{i,j} \leq \lfloor (1-\beta)\theta_i \rfloor, \forall x_i = 1$$

$$\sum_{x_j=1} y_{i,j} = \lfloor \theta_i \rfloor, \forall x_i = 0$$

$$\theta_i \leq W, \forall i \in \{1, 2, \ldots, n\}.$$

In the above equations, n refers to the total number of access points, i and j refer to access point indexes, $\pi_i$ refers to a fixed communication delay between AP $\upsilon_i$ and a local user request, AP $\upsilon_i$ refers to a hybrid edge server of an i-th access point, $\theta_i$ refers to the number of local user requests of AP $\upsilon_i$, m refers to the total number of hybrid edge servers, $\xi_{i,j}$ refers to a communication delay of scheduling a request from AP $\upsilon_i$ to AP $\upsilon_j$, AP $\upsilon_j$ refers to a hybrid edge server of a j-th access point, $y_{i,j}$ refers to the number of requests scheduled from AP $\upsilon_i$ to AP $\upsilon\upsilon_j$ having an edge server, $x_i$ refers to an indicative function value about whether there is a hybrid edge server near AP $\upsilon_i$, β refers to a ratio of private requests near the access point, α refers to a ratio of private resources in the hybrid edge server, K refers to a computing capability of the hybrid edge server, and W refers to a communication capability of the hybrid edge server.

Optionally, in a case of the insufficient computing resources and the sufficient communication resources, the MINLP model is established according to the sub-problem as follows:

$$\min \sum_{i=1}^{n} \lambda \zeta_i + \sum_{i=1}^{n} \pi_i \theta_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \leq \lfloor \alpha K \rfloor, \forall x_i = 1$$

$$i, j \in \{1, 2, \ldots, n\}$$

$$\zeta_i = \max\left\{0, \sum_{j=1}^{n} y_{j,i} - \lfloor (1-\alpha)K \rfloor \right\},$$

$$\sum_{j=1}^{n} y_{j,i} > \lfloor (1-\alpha)K \rfloor, \exists i \in \{i \mid x_i = 1, i = 1, 2, \ldots, n\}$$

$$\sum_{x_j=1} y_{i,j} \leq \lfloor (1-\beta)\theta_i \rfloor, \forall x_i = 1$$

$$\sum_{x_j=1} y_{i,j} \leq \lfloor \theta_i \rfloor, \forall x_i = 0$$

$$\sum_{i=1}^{n} \sum_{x_j=1} y_{i,j} + \zeta_i = \sum_{i=1}^{n} \lfloor (1-\beta)\theta_i \rfloor - \sum_{x_j=1} \lfloor (1-\alpha)K \rfloor,$$

$$\forall i \in \{1, 2, \ldots, n\}$$

$$\theta_i \leq W, \forall i \in \{1, 2, \ldots, n\}.$$

In the above equations, i and j refer to access point indexes, n refers to the total number of access points, $\Delta$ refers to a communication delay between any hybrid edge server in the communication network and a data center cloud, i refers to the number of requests offloaded to the data center cloud, $\pi_i$ refers to a fixed communication delay between AP $\upsilon_i$ and a local user request, $\theta_i$ refers to the number of local user requests of AP $\xi_{i,j}$ refers to a communication delay of scheduling a request from AP $\upsilon_i$ to AP $\upsilon_j$, $y_{i,j}$ refers to the number of requests scheduled from AP $\upsilon_i$ to AP $\upsilon_j$ with having an edge server locally, m refers to the total number of hybrid edge servers, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server, K refers to a computing capability of the hybrid edge server, W refers to a communication capability of the hybrid edge server, AP $\upsilon_i$ refers to a hybrid edge server of an i-th access point, and AP $\upsilon_j$ refers to a hybrid edge server of a j-th access point.

Optionally, in a case of the sufficient computing resources and the insufficient communication resources, the MINLP model is established according to the sub-problem as follows:

$$\min \sum_{i=1}^{n} \pi_i \chi_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \leq \lfloor \alpha K \rfloor, \forall x_i = 1$$

$$\sum_{x_j=1} y_{i,j} = \lfloor \chi_i - \beta \theta_i \rfloor, \forall x_i = 1$$

$$\sum_{x_j=1} y_{i,j} = \lfloor \chi_i \rfloor, \forall x_i = 0$$

$$\chi_i = \min\{\theta_i, W\}$$

$$i, j \in \{1, 2, \ldots, n\}$$

$$\sum_{j=1}^{n} y_{j,i} \leq \lfloor (1-\alpha)K \rfloor, \forall x_i = 1$$

$$\theta_i > W, \exists i \in \{1, 2, \ldots, n\}.$$

In the above equations, i and j refer to access point indexes, n refers to the total number of access points, $\pi_i$ refers to a fixed communication delay between AP $\upsilon_i$ and a local user request, $\chi_i$ refers to the number of requests in communication near AP $\upsilon_i$, $\theta_i$ refers to the number of local user requests of AP $\upsilon_i$, $\xi_{i,j}$ refers to a communication delay of scheduling a request from AP $\upsilon_i$ to AP $\upsilon_j$, $y_{i,j}$ refers to the number of requests scheduled from AP $\upsilon_i$ to AP $\upsilon_j$ with having an edge server locally, m refers to the total number of hybrid edge servers, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server, K refers to a computing capability of the hybrid edge server, W refers to a communication capability of the hybrid edge server, AP $\upsilon_i$ refers to a hybrid edge server of an i-th access point, and AP $\upsilon_j$ refers to a hybrid edge server of a j-th access point.

Optionally, in a case of the insufficient computing resources and the insufficient communication resources, the MINLP model is established according to the sub-problem as follows:

$$\min \sum_{i=1}^{n} \lambda \zeta_i + \sum_{i=1}^{n} \pi_i \chi_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \leq \lfloor \alpha K \rfloor, \forall x_i = 1$$

$$\zeta_i = \max\left\{0, \sum_{j=1}^{n} y_{j,i} - \lfloor (1-\alpha)K \rfloor \right\}$$

$$\chi_i = \min\{\theta_i, W\}$$

$$i, j \in \{1, 2, \ldots, n\}$$

$$\sum_{j=1}^{n} y_{j,i} > \lfloor (1-\alpha)K \rfloor, \exists i \in \{i \mid x_i = 1, i = 1, 2, \ldots, n\}$$

$$\theta_i > W, \exists i \in \{1, 2, \ldots, n\}$$

$$\sum_{x_j=1} y_{i,j} \leq \lfloor \chi_i - \beta \theta_i \rfloor, \forall x_i = 1$$

$$\sum_{x_j=1} y_{i,j} \leq \lfloor \chi_i \rfloor, \forall x_i = 0$$

$$\sum_{i=1}^{n}\sum_{x_j=1} y_{i,j} = \sum_{i=1}^{n} \lfloor (1-\beta)\theta_i \rfloor - \sum_{x_j=1} \lfloor (1-\alpha)K \rfloor,$$

$$\forall i \in \{1, 2, \ldots, n\}.$$

In the above equations, n refers to the total number of access points, $\lambda$ refers to a communication delay between any hybrid edge server in the communication network and a data center cloud, $\zeta_i$ refers to the number of requests offloaded from AP $\upsilon_i$ to the data center cloud, i and j refer to access point indexes, m refers to the total number of hybrid edge servers, $\pi_i$ refers to a fixed communication delay between AP $\upsilon_i$ and a local user request, $\theta_i$ refers to the number of local user requests of AP $\upsilon_i$, $\xi_{i,j}$ refers to a communication delay of scheduling a request from AP $\upsilon_i$ to AP $\upsilon_j$, $y_{i,j}$ refers to the number of requests scheduled from AP $\upsilon_i$ to AP $\upsilon_j$ with having an edge server locally, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server, K refers to a computing capability of the hybrid edge server, $x_i$ refers to the number of requests in communication near AP $\upsilon_i$, W refers to a communication capability of the hybrid edge server, AP $\upsilon_i$ refers to a hybrid edge server of an i-th access point, and AP $\upsilon_j$ refers to a hybrid edge server of a j-th access point.

According to a second aspect of the present disclosure, there is provided an apparatus for request scheduling of hybrid edge computing, including: an obtaining module, configured to obtain circumstances of a topological structure, computing resources and communication resources of a communication network; a determining module, configured to determine the number of hybrid edge servers placed in the communication network, where the hybrid edge server is a server providing services by using public resources and private resources; a dividing module, configured to divide a problem of an optimal request scheduling path of the hybrid edge server into sub-problems of Mixed-Integer Non-Linear Programming (MINLP) model according to the circumstances of the topological structure, the number, the computing resources and the communication resources of the network, where the problem of the optimal request scheduling path of the hybrid edge server is used to determine a placement node of the hybrid edge server and a target server for processing communication requests when the requirements of the minimum total communication delay and the maximum number of the processed communication requests in the communication network are satisfied, and the sub-problem includes any of the followings: a sub-problem of sufficient computing resources and sufficient communication resources, a sub-problem of insufficient computing resources and sufficient communication resources, a sub-problem of sufficient computing resources and insufficient communication resources and a sub-problem of insufficient computing resources and insufficient communication resources; a modeling module, configured to establish the MINLP model according to the sub-problems respectively; a converting module, configured to convert the MINLP model into a Mixed-Integer Linear Programming (MILP) equation; and a solving module, configured to solve the MILP equation to obtain the placement node of the hybrid edge server and the target server for processing the communication requests.

Optionally, in a case of the sufficient computing resources and the sufficient communication resources, the modeling module is configured to establish the MINLP model according to the sub-problem as follows:

$$\min \sum_{i=1}^{n} \pi_i \theta_i + \sum_{i=1}^{n}\sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \leq \lfloor \alpha K \rfloor, \forall x_i = 1$$

$$i, j \in \{1, 2, \ldots, n\}$$

$$\sum_{j=1}^{n} y_{j,i} \leq \lfloor (1-\alpha)K \rfloor, \forall x_i = 1$$

$$\sum_{j=1}^{n} y_{i,j} \leq \lfloor (1-\beta)\theta_i \rfloor, \forall x_i = 1$$

$$\sum_{x_j=1} y_{i,j} = \lfloor \theta_i \rfloor, \forall x_i = 0$$

$$\theta_i \leq W, \forall i \in \{1, 2, \ldots, n\}.$$

In the above equations, n refers to the total number of access points, i and j refer to access point indexes, $\pi_i$ refers to a fixed communication delay between AP $\upsilon_i$ and a local user request, AP $\upsilon_i$ refers to a hybrid edge server of an i-th access point, $\theta_i$ refers to the number of local user requests of AP $\upsilon_i$, m refers to the total number of hybrid edge servers, $\xi_{i,j}$ refers to a communication delay of scheduling a request from AP $\upsilon_i$ to AP $\upsilon_j$, AP $\upsilon_j$ refers to a hybrid edge server of a j-th access point, $y_{i,j}$ refers to the number of requests scheduled from AP $\upsilon_i$ to AP $\upsilon_j$ with having an edge server locally, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server, K refers to a computing capability of the hybrid edge server, and W refers to a communication capability of the hybrid edge server.

Optionally, in a case of the insufficient computing resources and the sufficient communication resources, the modeling module is configured to establish the MINLP model according to the sub-problem as follows:

$$\min \sum_{i=1}^{n} \lambda \zeta_i + \sum_{i=1}^{n} \pi_i \theta_i + \sum_{i=1}^{n}\sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \leq \lfloor \alpha K \rfloor, \forall x_i = 1$$

$$i, j \in \{1, 2, \ldots, n\}$$

-continued $$\zeta_i = \max\left\{0, \sum_{j=1}^{n} y_{j,i} - \lfloor(1-\alpha)K\rfloor\right\}$$

$$\sum_{j=1}^{n} y_{j,i} > \lfloor(1-\alpha)K\rfloor, \exists i \in \{i \mid x_i = 1, i = 1, 2, \ldots, n\}$$

$$\sum_{x_j=1} y_{i,j} \leq \lfloor(1-\beta)\theta_i\rfloor, \forall x_i = 1$$

$$\sum_{x_j=1} y_{i,j} \leq \lfloor\theta_i\rfloor, \forall x_i = 0$$

$$\sum_{i=1}^{n}\sum_{x_j=1} y_{i,j} + \zeta_i = \sum_{i=1}^{n}\lfloor(1-\beta)\theta_i\rfloor - \sum_{x_j=1}\lfloor(1-\alpha)K\rfloor,$$

$$\forall i \in \{1, 2, \ldots, n\}$$

$$\theta_i \leq W, \forall i \in \{1, 2, \ldots, n\}.$$

In the above equations, i and j refer to access point indexes, n refers to the total number of access points, $\lambda$ refers to a communication delay between any hybrid edge server in the communication network and a data center cloud, $\zeta_i$ refers to the number of requests offloaded from AP $\upsilon_i$ to the data center cloud, $\pi_i$ refers to a fixed communication delay between AP $\upsilon_i$ and a local user request, $\theta_i$ refers to the number of local user requests of AP $\upsilon_i$, $\xi_{i,j}$ refers to a communication delay of scheduling a request from AP $\upsilon_i$ to AP $\upsilon_j$, $y_{i,j}$ refers to the number of requests scheduled from AP $\upsilon_i$ to AP $\upsilon_j$ with having an edge server locally, m refers to the total number of hybrid edge servers, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server, K refers to a computing capability of the hybrid edge server, W refers to a communication capability of the hybrid edge server, AP $\upsilon_i$ refers to a hybrid edge server of an i-th access point, and AP $\upsilon_j$ refers to a hybrid edge server of a j-th access point.

According to a third aspect of the present disclosure, there is provided an electronic device, including a memory, a processor and computer programs that are stored on the memory and executable by the processor, where the processor executes the programs to implement any of the methods of request scheduling of hybrid edge computing according to the first aspect of the present disclosure.

According to a fourth aspect of the present disclosure, there is provided a non-transitory computer readable storage medium storing computer instructions, where the computer instructions are configured to cause the computer to perform any of the methods of request scheduling of hybrid edge computing according to the first aspect of the present disclosure.

It can be seen from the above descriptions that the problem of the optimal request scheduling of the hybrid edge server is modeled into sub-problems of MINLP model according to the circumstances of the computing resources and the communication resources, and the problem of the optimal request scheduling of the hybrid edge server is solved by converting the MINLP model into the MILP equation, and solving the MILP equation, thereby improving the request scheduling efficiency when the requirements of the minimum total communication delay and the maximum number of processed communication requests are satisfied.

BRIEF DESCRIPTIONS OF THE DRAWINGS

To describe the technical solutions in the examples of the present disclosure or in the prior art more clearly, drawings required in descriptions of the examples of the present disclosure or the prior art will be briefly introduced below. It is apparent that the drawings described below are merely some examples of the present disclosure and other drawings may be obtained by those of ordinary skill in the art based on these drawings without paying creative work.

DETAILED DESCRIPTIONS OF EMBODIMENTS

To understand the objects, technical solutions and advantages of the present disclosure more clearly, the present disclosure will be further described in detail below in combination with specific examples and drawings.

It is to be noted that all expressions using "first" and "second" in the examples of the present disclosure are intended to distinguish non-same entities or non-same parameters of a same name. It can be seen that "first" and "second" are only used for convenience of expression rather than limiting the examples of the present disclosure, which will not be described specifically in subsequent examples. With the help of edge computing, most cloud services may be offloaded to edge servers to obtain better Quality of Service (QoS). These services are usually accessible by the public (for example, through an open Application Programming Interface (API)) and serve a large number of users (for example, services based on position information). In the present disclosure, such services are referred to as public edge services.

At present, more and more enterprises seek to deploy their own services at an edge of a communication network to further improve performance, prolong stable and normal runtime, and ensure high-level privacy security. In addition, a large amount of personal data previously managed in private IoT devices is expected to be transferred to edge servers for centralized processing so as to solve problems of insufficient sufficient computing resources and storage capacities in the IoT devices. The above descriptions all call for customizing new edge services for enterprises or users. In the present disclosure, such services are referred to as private edge services.

It is expected that the services provided by edges shall include public edge services and private edge services. In addition, with increasing service employments, the public edge services and the private edge services may exist on public edge servers to improve a utilization rate of edge resources, thereby resulting in a hybrid edge service environment.

In the present disclosure, the public edge services, the private edge services and the hybrid edge services are defined as below.

Public edge services: the public edge services are services that are provided by a government or another supplier for the public and respond to user requests by using limited computing resources on a public memory and an edge device.

Private edge services: to better manage and control user experiences and data and even to protect privacy, the private edge services are proposed herein as a solution that uses private resources and processes endpoints dispersed from a cloud to a vicinity of users.

Hybrid edge services: with development of edge computing and hybrid clouds, resource integration and a hybrid edge service layout may be realized. On this premise, services provided by fully using public resources and private resources are referred to as hybrid edge services.

Figure 1:
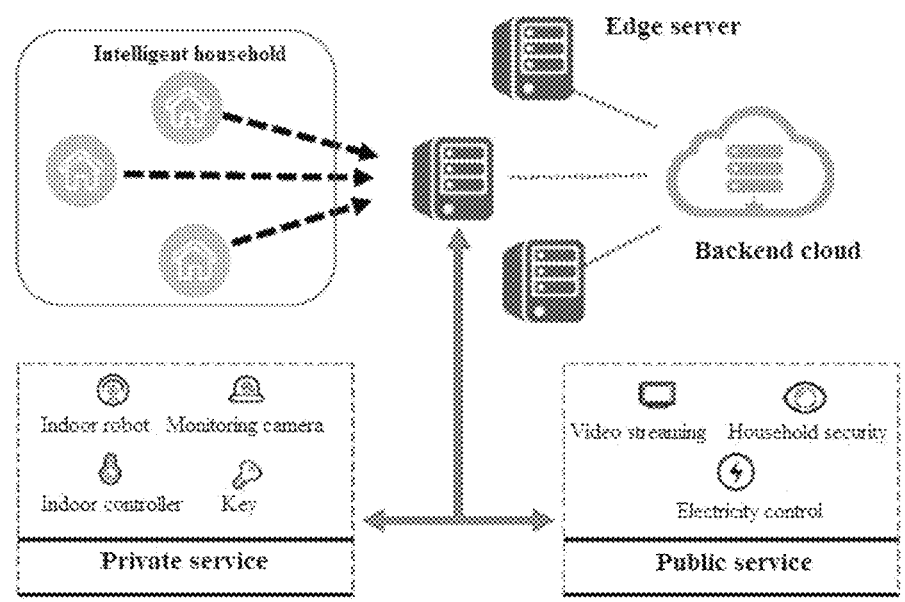
FIG. 1 is a schematic diagram illustrating a hybrid edge service environment in an intelligent household.

FIG. 1 illustrates a hybrid edge service environment in an intelligent household according to an example of the present disclosure. Different edge services (for example, a security service, video streaming, a household robot, and the like) are integrated in the intelligent household. As one of public edge services, the video streaming is provided in many intelligent households, where video copies are cached in their nearby edge servers. In comparison, some other edge services (for example, data analysis in the intelligent household) usually involves privacy of residents, and thus are more likely to be provided by some private edge services. Therefore, to satisfy diversified requirements of residents, services are to be provided to the intelligent households through the hybrid edge services. Based on this, the present disclosure provides a request scheduling method based on hybrid edge services.

Figure 2:
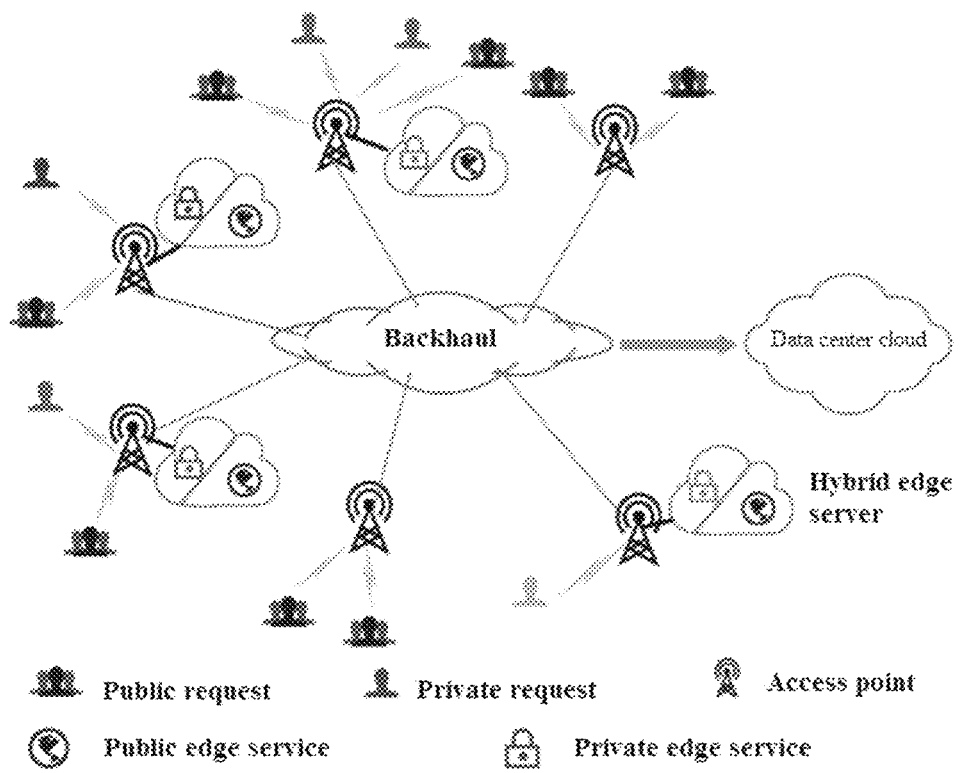
FIG. 2 is a schematic diagram illustrating a framework of hybrid edge computing.

FIG. 2 illustrates a framework of hybrid edge computing according to an example of the present disclosure. As shown in FIG. 2, a hybrid edge server is deployed at an edge of a communication network to process requests cooperatively with a data center cloud. Firstly, the hybrid edge server is much smaller than an ordinary hybrid cloud, and thus has better flexibility and expandability like a mobile edge cloud (MEC). Further, the hybrid edge server is located at the same position as a wireless access point. Secondly, services stored in one hybrid edge server include private services and public services, where the private services can serve local authentication requests only when the public services may serve local or remote public user requests. Thirdly, communication resources may be shared at the access point (AP) because it can receive different services, but computing resources cannot be shared in the hybrid edge server because strict zoning is present in the edge clouds to process different types of service requests (i.e., private service requests and public service requests). In the present disclosure, the hybrid edge server may be considered to have a unified computing capability and a sufficient storage space for storing services, and the AP has a unified communication capability.

A network model involved in the examples of the present disclosure is described below.

The network model of the present disclosure is formed in a Wireless Metropolitan Area Network (WMAN) environment. In the present disclosure, topology of a network is simulated by using an undirected graph G (V, E), where V refers to a vertex set including n access points (AP), and E refers to a set of edges of all communication links connected by corresponding APs. Let m be a cardinal number of E. It is assumed that there is an average communication delay between AP $v_i$ and its local service request. It is also assumed that there is an average communication delay between AP $v_i$ and AP $v_j$, where AP $v_i$ refers to a hybrid edge server of an i-th access point, and AP $v_j$ refers to a hybrid edge server of a j-th access point.

Service requests and responses involved in the examples of the present disclosure are described below.

In the examples of the present disclosure, the service requests of the user or the edge device for the hybrid edge server include public requests and private requests requesting public services and private services on the hybrid edge server respectively. In such an isomorphic network model, it is assumed that a ratio of public requests to private requests is fixed within a range of any AP. When a user request is sent to a local AP, if there is a local hybrid edge server with a sufficient capacity, the user request is processed locally. Otherwise, the user request will be scheduled to a remote server with a sufficient capacity. Assuming that all service requests require the same computing resources and the computing resources are sufficient, computing may be performed. In addition, it is assumed that all links in the network model have sufficient communication capacities compared with all requests to be scheduled. In a system model, scheduling is to be performed with limited resources so as to better satisfy hybrid service requests.

Figure 3:
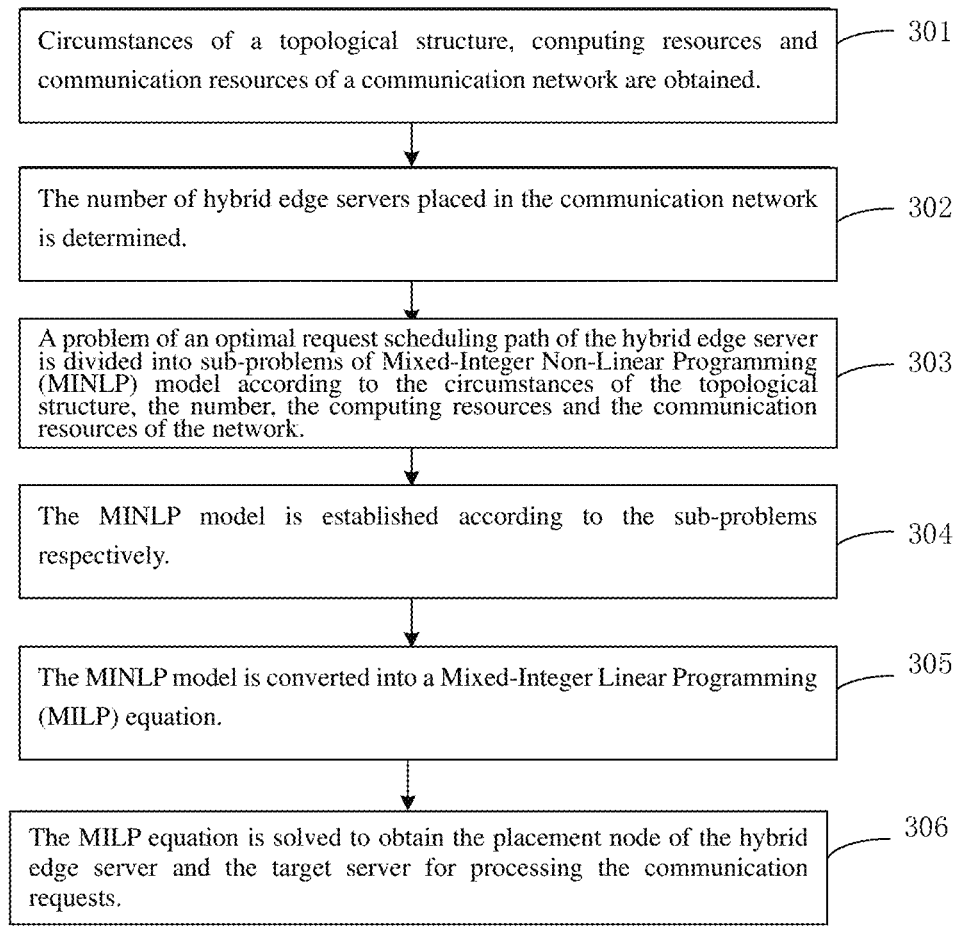
FIG. 3 is a flowchart illustrating a method of request scheduling of hybrid edge computing according to an example of the present disclosure.

FIG. 3 is a flowchart illustrating a method of request scheduling of hybrid edge computing according to an example of the present disclosure. As shown in FIG. 3, the method includes the following blocks.

At block 301, circumstances of a topological structure, computing resources and communication resources of a communication network are obtained.

At block 302, the number of hybrid edge servers placed in the communication network is determined, where the hybrid edge server is a server providing services by using public resources and private resources.

At block 303, a problem of an optimal request scheduling path of the hybrid edge server is divided into sub-problems of Mixed-Integer Non-Linear Programming (MINLP) model according to the circumstances of the topological structure, the number, the computing resources and the communication resources of the network, where the problem of the optimal request scheduling path of the hybrid edge server is used to determine a placement node of the hybrid edge server and a target server for processing the communication requests when requirements of a minimum total communication delay and a maximum number of the processed communication requests in the communication network are satisfied. The sub-problem includes any of the followings:

a sub-problem of sufficient computing resources and sufficient communication resources, a sub-problem of insufficient computing resources and sufficient communication resources, a sub-problem of sufficient computing resources and insufficient communication resources and a sub-problem of insufficient computing resources and insufficient communication resources.

In an implementation, in a case of the sufficient computing resources and the sufficient communication resources, the MINLP model is established according to the sub-problem as follows:

$$\min \sum_{i=1}^{n} \pi_i \theta_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \leq \lfloor \alpha K \rfloor, \forall x_i = 1$$

$$i, j \in \{1, 2, \ldots, n\}$$

$$\sum_{j=1}^{n} y_{j,i} \leq \lfloor (1-\alpha)K \rfloor, \forall x_i = 1$$

$$\sum_{j=1}^{n} y_{i,j} \leq \lfloor (1-\beta)\theta_i \rfloor, \forall x_i = 1$$

$$\sum_{x_j=1} y_{i,j} = \lfloor \theta_i \rfloor, \forall x_i = 0$$

$$\theta_i \leq W, \forall i \in \{1, 2, \ldots, n\}.$$

In an implementation, in a case of the insufficient computing resources and the sufficient communication resources, the MINLP model is established according to the sub-problem as follows:

$$\min \sum_{i=1}^{n} \lambda \zeta_i + \sum_{i=1}^{n} \pi_i \theta_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \leq \lfloor \alpha K \rfloor, \forall x_i = 1$$

$$i, j \in \{1, 2, \ldots, n\}$$

$$\zeta_i = \max\left\{0, \sum_{j=1}^{n} y_{j,i} - \lfloor (1-\alpha)K \rfloor\right\}$$

$$\sum_{j=1}^{n} y_{j,i} > \lfloor (1-\alpha)K \rfloor, \exists i \in \{i \mid x_i = 1, i = 1, 2, \ldots, n\}$$

$$\sum_{x_j=1} y_{i,j} \leq \lfloor (1-\beta)\theta_i \rfloor, \forall x_i = 1$$

$$\sum_{x_j=1} y_{i,j} \leq \lfloor \theta_i \rfloor, \forall x_i = 0$$

$$\sum_{i=1}^{n} \sum_{x_j=1} y_{i,j} + \zeta_i = \sum_{i=1}^{n} \lfloor (1-\beta)\theta_i \rfloor - \sum_{x_j=1} \lfloor (1-\alpha)K \rfloor,$$

$$\forall i \in \{1, 2, \ldots, n\}$$

$$\theta_i \leq W, \forall i \in \{1, 2, \ldots, n\}.$$

In an implementation, in a case of the sufficient computing resources and the insufficient communication resources, the MINLP model is established according to the sub-problem as follows:

$$\min \sum_{i=1}^{n} \pi_i \chi_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \leq \lfloor \alpha K \rfloor, \forall x_i = 1$$

$$\sum_{x_j=1} y_{i,j} = \lfloor \chi_i - \beta \theta_i \rfloor, \forall x_i = 1$$

$$\sum_{x_j=1} y_{i,j} = \lfloor \chi_i \rfloor, \forall x_i = 0$$

$$\chi_i = \min\{\theta_i, W\}$$

$$i, j \in \{1, 2, \ldots, n\}$$

$$\sum_{j=1}^{n} y_{j,i} \leq \lfloor (1-\alpha)K \rfloor, \forall x_i = 1$$

$$\theta_i > W, \exists i \in \{1, 2, \ldots, n\}.$$

In an implementation, in a case of the insufficient computing resources and the insufficient communication resources, the MINLP model is established according to the sub-problem as follows:

$$\min \sum_{i=1}^{n} \lambda \zeta_i + \sum_{i=1}^{n} \pi_i \chi_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \leq \lfloor \alpha K \rfloor, \forall x_i = 1$$

$$\zeta_i = \max\left\{0, \sum_{j=1}^{n} y_{j,i} - \lfloor (1-\alpha)K \rfloor\right\}$$

$$\chi_i = \min\{\theta_i, W\}$$

$$i, j \in \{1, 2, \ldots, n\}$$

$$\sum_{j=1}^{n} y_{j,i} > \lfloor (1-\alpha)K \rfloor, \exists i \in \{i \mid x_i = 1, i = 1, 2, \ldots, n\}$$

$$\theta_i > W, \exists i \in \{1, 2, \ldots, n\}$$

$$\sum_{x_j=1} y_{i,j} \leq \lfloor \chi_i - \beta \theta_i \rfloor, \forall x_i = 1$$

$$\sum_{x_j=1} y_{i,j} \leq \lfloor \chi_i \rfloor, \forall x_i = 0$$

$$\sum_{i=1}^{n} \sum_{x_j=1} y_{i,j} = \sum_{i=1}^{n} \lfloor (1-\beta)\theta_i \rfloor - \sum_{x_j=1} \lfloor (1-\alpha)K \rfloor,$$

$$\forall i \in \{1, 2, \ldots, n\}.$$

In the above different implementations, different parameters are defined as follows:

n refers to the total number of access points, i and j refer to access point indexes, $\pi_i$ refers to a fixed communication delay between AP $\upsilon_i$ and a local user request, AP $\upsilon_i$ refers to a hybrid edge server of an i-th access point, $\theta_i$ refers to the number of local user requests of AP $\upsilon_i$, m refers to the total number of hybrid edge servers. $\xi_{i,j}$ refers to a communication delay of scheduling a request from AP $\upsilon_i$ to AP $\upsilon_j$, AP $\upsilon_j$ refers to a hybrid edge server of a j-th access point, $y_{i,j}$ refers to the number of requests scheduled from AP $\upsilon_i$ to AP $\upsilon_j$ with having an edge server locally, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server. K refers to a computing capability of the hybrid edge server, W refers to a communication capability of the hybrid edge server, $\lambda$ refers to a communication delay between any hybrid edge server in the communication network and a data center cloud, $\zeta_i$ refers to the number of requests offloaded from AP $\upsilon_i$ to the data center cloud, and $\chi_i$ refers to the number of requests in communication near AP $\upsilon_i$.

At block 304, the MINLP model is established according to the sub-problems respectively.

At block 305, the MINLP model is converted into a Mixed-Integer Linear Programming (MILP) equation.

At block 306, the MILP equation is solved to obtain the placement node of the hybrid edge server and the target server for processing the communication requests.

In an implementation, the communication requests are scheduled to the target server after the target server is determined.

In an implementation, when the private services are transferred from the IoT device to the hybrid edge server, a relevant user may request corresponding services at any time. At the same time, the data center cloud allocates copies of the required public services on the server for the relevant user. In these two cases, each hybrid edge server has a sufficient storage space; otherwise, the server will be failed. Therefore, when the user requests the hybrid edge services, it is not required to consider a storage competition relationship of servers. Since the hybrid edge sever has a sufficient memory to store the hybrid services, only limitations of the communication capability and the computing capability of the hybrid communication network may be considered. There will be a competition when the private requests and the public edge requests are sent at the same time. Therefore, resource limitation in the communication network is introduced below with a communication constraint of local request scheduling and a computing constraint of local and remote request scheduling respectively.

The communication constraint of local request scheduling: the communication constraint determines the number of total requests sent in a region covered by an access point (AP). No matter which requests, i.e., private requests or public requests, are sent by the user, the user will share communication resources. Only the local communication constraint problem is considered herein since communication capacity of a link between different APs is sufficient. Let W be the number of local communication requests of one AP in one time slice and a unified communication capacity of any given AP. Then, the user requests are divided into public requests and private requests. Let s be a ratio of private requests to total requests of AP and 1−$\beta$ be a ratio of public requests to total requests. In the normal case, there are service requests no greater than W in a local region of any AP. No matter which place the service requests are scheduled to, this is a constraint that must be satisfied. Therefore, $\theta_1$ is the number of total user requests of AP $\upsilon_i$, and $\chi_i$ is the number of communicable requests, which is equal to min $\{\theta_i, W\}$. When the requests are processed locally, a communication delay from AP $\upsilon_i$ to the hybrid edge server near AP $\upsilon_i$ is represented as $\pi_i$. In addition, if a request of AP $\upsilon_i$ are is scheduled to AP $\upsilon_j$, the communication delay is represented as $\xi_{i,j}$.

The computing constraint of local and remote request scheduling: if K is a computing capacity of any given hybrid edge server, it means the maximum number of requests that can be processed and responded by the server. The computing capacity may be divided into a private part and a public part, which represent the maximum numbers of private requests and public requests that can be processed by the server respectively. Let a be a proportion of the private part and 1−$\alpha$ be a proportion of the public part. Usually, the private part of any given hybrid edge server may process all private requests in one time slice since it may be considered that it is very important to satisfy requests of private users in priority. However, when the public part is involved, the circumstance will become different since the local computing resources cannot always satisfy requirements. Therefore, an excessive part of the public requests will be scheduled onto a hybrid edge server with an extra computing capability. In addition, due to limited computing capability, the hybrid edge server may need to offload some requests to a remote data center cloud. The number of requests offloaded from AP $\upsilon_i$ to the center cloud is represented as $\zeta_i$. Herein, it is assumed that the center cloud has a capability of processing all the offloaded requests and a fixed delay $\lambda$ is present between the hybrid edge server and the center cloud.

The problem of optimal request scheduling based on hybrid edge server placement (ORS-HESP) is analyzed below.

Firstly, a position of the hybrid edge server may be considered before a request of hybrid edge service is scheduled. When the hybrid edge server is deployed in the communication network, the hybrid edge server may be deployed near a corresponding AP according to a private user request, and then, how to schedule the user request to some edge servers is determined. In this way, the total communication delay is minimized in consideration of the constraints of computing resources and communication resources.

Since there are m APs in the communication network, a group of variables X=$\{x_i|1 \leq i \leq m\}$ may be introduced, and each $x_i$=1 which refers to that the hybrid edge server is adjacent to one AP $\upsilon_i$; otherwise, $x_i$=0. If $x_j'$=1, $y_{i',j} \geq 0$ may refer to the number of service requests that are routed to the hybrid edge server AP $\upsilon_j$, from AP $\upsilon_{i'}$; otherwise, $y_{i',j}$=0.

To achieve the purpose of minimizing the total communication delay in consideration of the constraints of computing resources and communication resources, the problem of optimal request scheduling based on hybrid edge server placement may be modeled into a Mixed-Integer Non-linear Programming (MINLP) model. The model of the problem of optimal request scheduling based on hybrid edge server placement (ORS-HESP), (hereinafter referred to as a model (1)) is as follows:

$$\min \sum_{i=1}^{n} \lambda \zeta_i + \sum_{i=1}^{n} \pi_i \chi_i + \sum_{i=1}^{n} \sum_{j=1}^{n} \xi_{i,j} y_{i,j} \tag{1a}$$

s.t.

-continued $$\sum_{i=1}^{n} x_i = m, x_i \in \{0, 1\} \tag{1b}$$

$$\lfloor \beta \theta_i \rfloor \leq \lfloor \alpha K \rfloor, \forall x_i = 1 \tag{1c}$$

$$\sum_{j=1}^{n} y_{j,i} - \zeta_i \leq \lfloor (1-\alpha)K \rfloor, \forall x_i = 1 \tag{1d}$$

$$\sum_{j=1}^{n} y_{i,j} + \lfloor \beta \theta_i \rfloor \leq W, \forall x_i = 1 \tag{1e}$$

$$\sum_{j=1}^{n} y_{i,j} \leq W, \forall x_i = 0 \tag{1f}$$

$$\sum_{x_j=1} y_{i,j} = \lfloor \chi_i - \beta \theta_i \rfloor, \forall x_i = 1 \tag{1g}$$

$$\sum_{x_j=1} y_{i,j} = \lfloor \chi_i \rfloor, \forall x_i = 0 \tag{1h}$$

$$\zeta_i = \max\left\{0, \sum_{j=1}^{n} y_{j,i} - \lfloor (1-\alpha)K \rfloor\right\} \tag{1i}$$

$$\chi_i = \min\{\theta_i, W\} \tag{1j}$$

$$i, j \in \{1, 2, \ldots, n\}. \tag{1k}$$

In the above equations, a target function (1a) refers to a minimized total delay of communication network. A constraint (k) specifies a range of values of parameters i and j. A constraint (1b) ensures that there are only m hybrid edge servers on the AP. Constraints (1c) and (1d) refer to a private computing capacity limitation and a public computing capacity limitation respectively. Constraints (1e) and (1f) specify that the communication capacity should be satisfied on any AP no matter whether there is a hybrid edge server nearby. Constraints (1g) and (1h) indicate that the total number of user requests processable by an AP on another hybrid edge server is equal to a sum of numbers of requests scheduled from the AP to an AP of another adjacent server. (1i) and (1j) show the expressions of $\zeta_i$ and $\chi_i$ respectively.

A competition relationship of resources in the request scheduling method according to the present disclosure is analyzed below.

Figure 4:
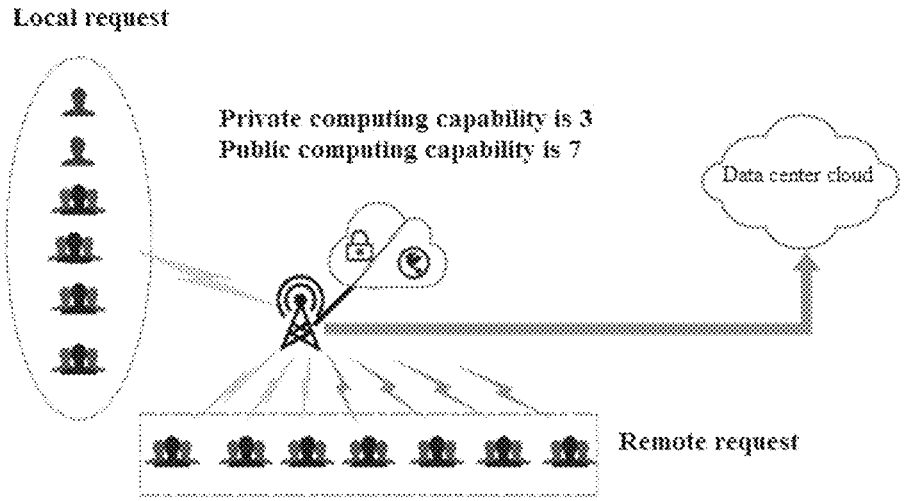
FIG. 4 is a schematic diagram illustrating a competition of computing resources according to an example of the present disclosure.

A competition rule of computing resources: it is assumed that there is only competition of computing resources on the hybrid edge server, and there is the competition rule. A local request locally sent by the user will be the first request processed by the hybrid edge server adjacent to the local AP. There is no competition between public requests and private requests locally since they are processed in different parts (public or private parts). If the public computing resources on the hybrid edge server can still process requests, remote public requests from another AP may queue up for processing on the hybrid edge server. Since the queue is only considered be in a static state herein, the requests will be computed in one time slot. For any hybrid edge server, the number of the received service requests cannot exceed the limitation of computing resources, and the requests obtain the computing resources according to a rule of "first come, first serve", that is, based on a path length or a delay size. As shown in FIG. 4, it can be seen that the excessive requests are allocated to the data center cloud because it has unlimited computing capability to process all requests.

Figure 5:
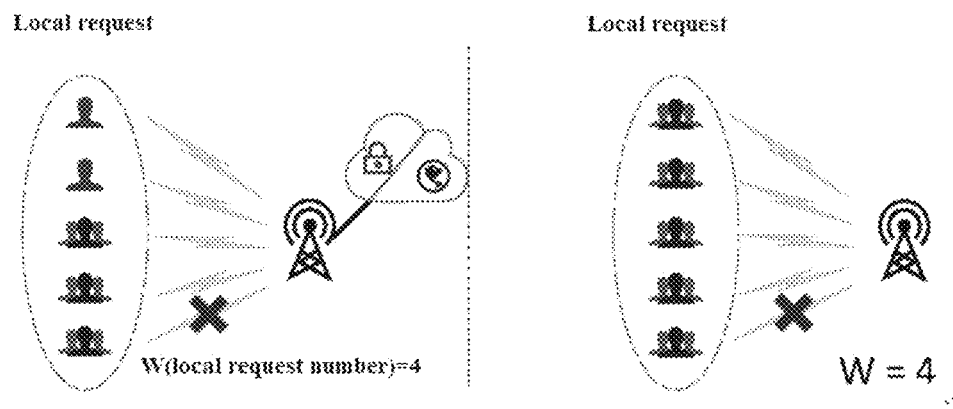
FIG. 5 is a schematic diagram illustrating a competition of communication resources according to an example of the present disclosure.

A competition rule of communication resources: the number of local requests scheduled to the server through the AP cannot exceed the communication capacity of the AP in consideration of the local communication resource competition. It is required to know all local requests sharing the same bandwidth. However, due to security and importance of private requests, the communication of private requests is firstly satisfied in one time slot, and the communication of public requests is then considered. On the premise of sufficient communication resources, the local public requests are processed fairly and served as possible. When the number W of local public requests exceeds the limitation of communication resources, additional requests will be postponed into another time slice as shown in FIG. 5. There is no competition between APs or between the AP and the data center cloud since the bandwidth is sufficient to satisfy communication requirements of all requests.

Figure 6:
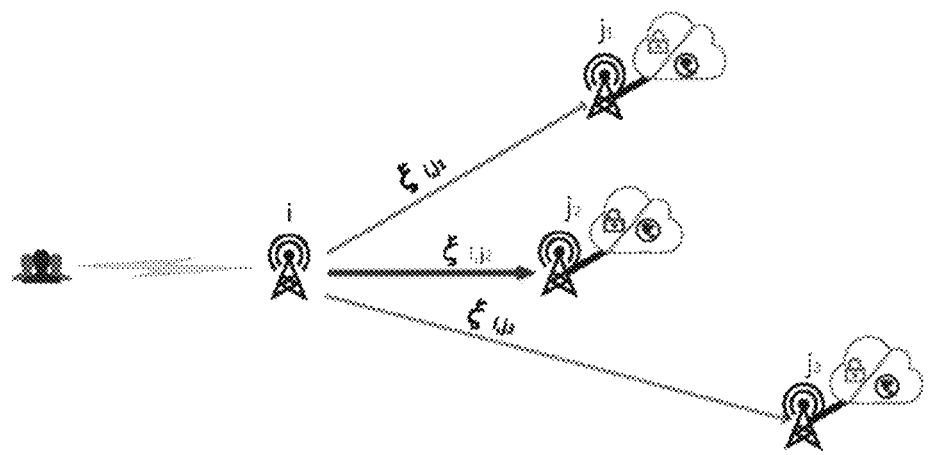
FIG. 6 is a schematic diagram illustrating selection of a path with a minimum delay in a request scheduling process according to an example of the present disclosure.

Selection of the scheduling path: when the received public requests come from an AP that does not have a hybrid edge server or has a server exceeding the local computing capacity, the requests are scheduled to another edge server with a sufficient processing capability. As shown in FIG. 6, $\upsilon_i$ refers to an AP without an edge server, and $\upsilon j1$, $\upsilon j2$ and $\upsilon j3$ refer to APs adjacent to the edge server. When the public requests of $\upsilon_i$ are to be scheduled to the edge server, a path with the minimum delay may be selected. In this case, the size of the delay may be represented by a length of distance. Then, it is found that $\xi\_(i,j) < \xi\_(i,j) < \xi\_(i,j)$, which means that a path from $\upsilon i$ to $\upsilon j2$ will be selected, and the public requests will be processed on the edge server adjacent to $\upsilon j2$.

When the problem of optimal request scheduling based on hybrid edge server placement in the WMAN is considered, the placement of the hybrid edge server may be firstly considered. The hybrid edge server may mainly be a server customized for a private user, and the server may consider a frequency of the public user request and popularity of a site selected by the hybrid edge server at the same time.

Although there are $C_n^m$ possibilities that m hybrid edge servers are arranged near n APs, a particular solution may be selected according to the above conditions. It is assumed that the placement problem of the hybrid edge server is non-deterministic and is preset for the ORS-HESP problem. Even if the limitations of computing resources and communication resources are neglected, the ORS-HESP problem is still a very troublesome problem. Therefore, in the present disclosure, the above problem is divided into the following four sub-problems.

In the ORS-HESP problem with sufficient computing resources and sufficient communication resources (SKSW-ORS-HESP) in the communication network, the sufficient computing resources and the sufficient communication resources mean that no request will be scheduled to the data center cloud and all requests will be processed in the hybrid edge server. That is, $\zeta_i = \max 0$, $\chi_i = \min \theta_i$. There is no remote delay between the hybrid edge server and the center cloud. Therefore, the above model (1) may be rewritten as follows:

$$\min \sum_{i=1}^{n} \pi_i \theta_i + \sum_{i=1}^{n} \sum_{j=1}^{n} \xi_{i,j} y_{i,j} \tag{2a}$$

s.t.

$$(1b), (1c), (1k) \tag{2b}$$

-continued $$\sum_{j=1}^{n} y_{j,i} \leq \lfloor (1-\alpha)K \rfloor, \forall x_i = 1 \quad (2c)$$

$$\sum_{j=1}^{n} y_{i,j} \leq \lfloor (1-\beta)\theta_i \rfloor, \forall x_i = 1 \quad (2d)$$

$$\sum_{x_j=1} y_{i,j} = \lfloor \theta_i \rfloor, \forall x_i = 0 \quad (2e)$$

$$\theta_i \leq W, \forall i \in \{1, 2, \ldots, n\}. \quad (2f)$$

In the ORS-HESP problem with insufficient computing resources and sufficient communication resources (IKSW-ORS-HESP), the insufficient computing resources mean that there will always be one server lacking computing resources, that is, $\exists x_i=1, \Sigma_{j=1}^{n} y_{j,i} > \lfloor (1-\alpha)K \rfloor$. The sufficient communication resources mean that all service requests within a coverage of an AP will be scheduled to the hybrid edge sever or the data center cloud for processing through the AP without delay. Based on this, the above model (1) may be rewritten as follows:

$$\min \sum_{i=1}^{n} \lambda \zeta_i + \sum_{i=1}^{n} \pi_i \theta_i + \sum_{i=1}^{n} \sum_{j=1}^{n} \xi_{i,j} y_{i,j} \quad (3a)$$

s.t.

(1b), (1c), (1k), (1i) \quad (3b)

$$\sum_{j=1}^{n} y_{j,i} > \lfloor (1-\alpha)K \rfloor, \exists i \in \{i \mid x_i = 1, i = 1, 2, \ldots, n\} \quad (3c)$$

$$\sum_{x_j=1} y_{i,j} \leq \lfloor (1-\beta)\theta_i \rfloor, \forall x_i = 1 \quad (3d)$$

$$\sum_{x_j=1} y_{i,j} \leq \lfloor \theta_i \rfloor, \forall x_i = 0 \quad (3e)$$

$$\sum_{i=1}^{n} \sum_{x_j=1} y_{i,j} + \zeta_i = \sum_{i=1}^{n} \lfloor (1-\beta)\theta_i \rfloor - \sum_{x_j=1} \lfloor (1-\alpha)K \rfloor, \quad (3f)$$

$$\forall i \in \{1, 2, \ldots, n\}$$

$$\theta_i \leq W, \forall i \in \{1, 2, \ldots, n\}. \quad (3g)$$

In the ORS-HESP problem with sufficient computing resources and insufficient communication resources (SKIW-ORS-HESP), it means that all n APs cannot satisfy communication of all local requests of the APs and the excessive requests will be delayed. Therefore, the above model (1) may be rewritten as follows:

$$\min \sum_{i=1}^{n} \pi_i \chi_i + \sum_{i=1}^{n} \sum_{j=1}^{n} \xi_{i,j} y_{i,j} \quad (4a)$$

s.t.

(1b), (1c), (1g), (1h), (1j), (1k), \quad (4b)

$$\sum_{j=1}^{n} y_{j,i} \leq \lfloor (1-\alpha)K \rfloor, \forall x_i = 1 \quad (4c)$$

$$\theta_i > W, \exists i \in \{1, 2, \ldots, n\}. \quad (4d)$$

In the ORS-HESP problem with insufficient computing resources and insufficient communication resources (IKIW-ORS-HESP), the computing resources and the communication resources are both insufficient, which means that some requests within the coverage of the APs with insufficient communication resources will be delayed. Then, the number of all public requests still exceeds the computing capability of total public requests, resulting in that the excessive requests are scheduled to the center cloud. Based on the above descriptions, it is required to introduce constraints (3c) and (4d). Therefore, the model (1) may be rewritten as follows:

(1a) \quad (5a)

s.t.

(1b), (1c), (1i), (1j), (1k), (3c), (4d), \quad (5b)

$$\sum_{x_j=1} y_{i,j} \leq \lfloor \chi_i - \beta\theta_i \rfloor, \forall x_i = 1 \quad (5c)$$

$$\sum_{x_j=1} y_{i,j} \leq \lfloor \chi_i \rfloor, \forall x_i = 0 \quad (5d)$$

$$\sum_{i=1}^{n} \sum_{x_j=1} y_{i,j} = \sum_{i=1}^{n} \lfloor (1-\beta)\theta_i \rfloor - \sum_{x_j=1} \lfloor (1-\alpha)K \rfloor, \quad (5e)$$

$$\forall i \in \{1, 2, \ldots, n\}.$$

In conclusion, to effectively solve the ORS-HESP problem, the problem is divided into four sub-problems which are converted into corresponding MILP models. Given the communication network G=(V, E), the placement of the hybrid edge server will be determined according to the service requests of the site or the requirements of private service. Then, whether partial requests are to be delayed is determined by checking the communication resource constraint at each AP, and whether it is necessary to schedule the partial requests to the data center cloud is determined by checking the computing resource constraint of each hybrid edge server.

The performance of the request scheduling method according to the present disclosure is evaluated below by introducing an experimental environment and pre-placing the AP and the hybrid edge server.

Figure 7:
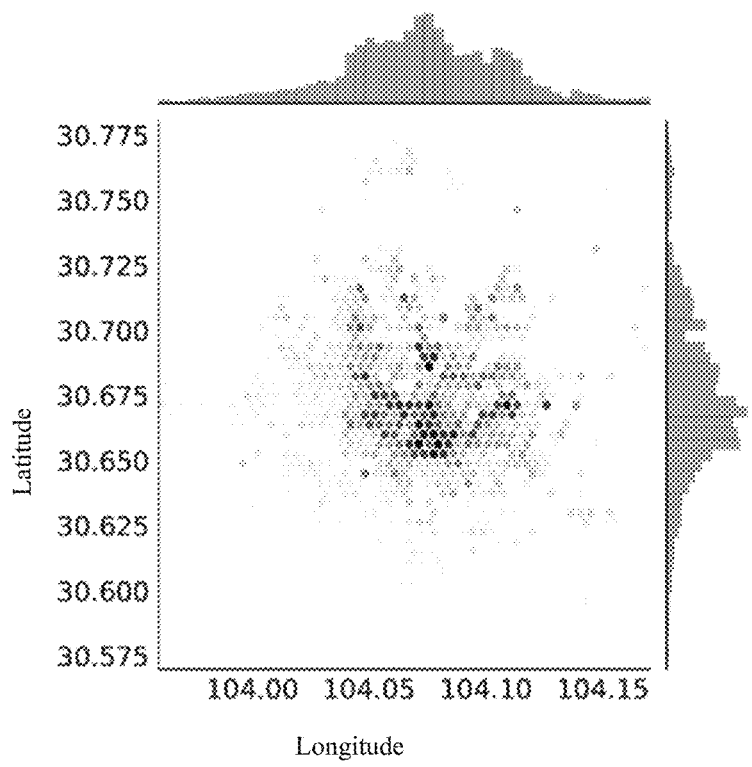
FIG. 7 is a schematic diagram illustrating request data of a taxi call order in Chengdu City according to an example of the present disclosure.
Figure 8A:
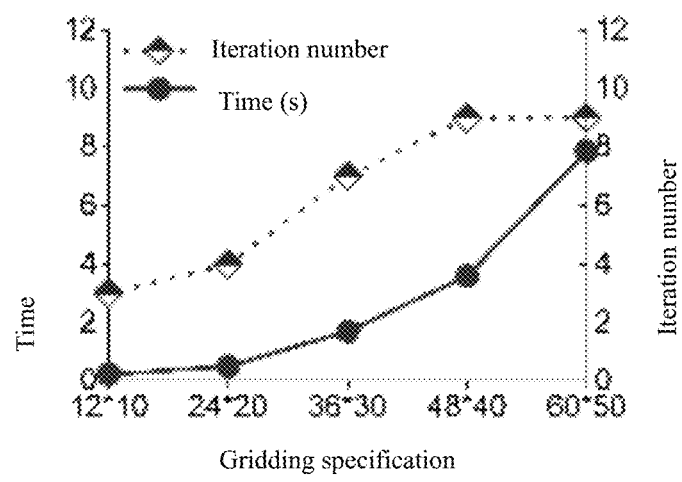
FIGS. 8A-8D are curve graphs illustrating effects of gridding specifications on a computing time and a number of times of iteration in sub-problems of SKSW, SKIW, IKSW and IKIW according to an example of the present disclosure.
Figure 8B:
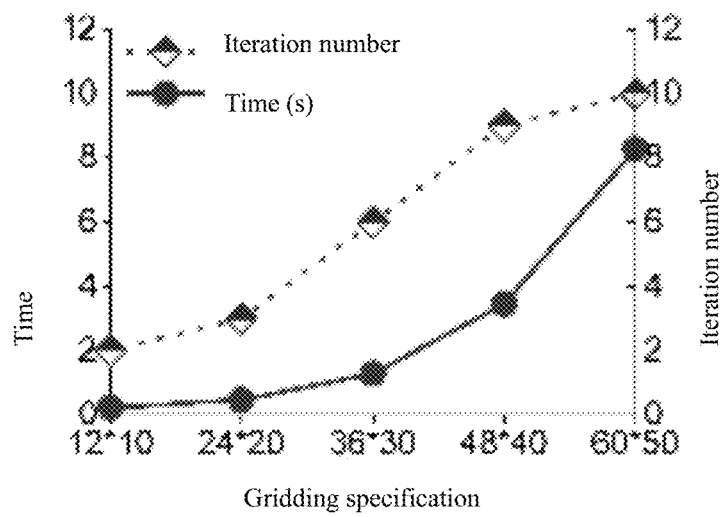
Figure 8C:
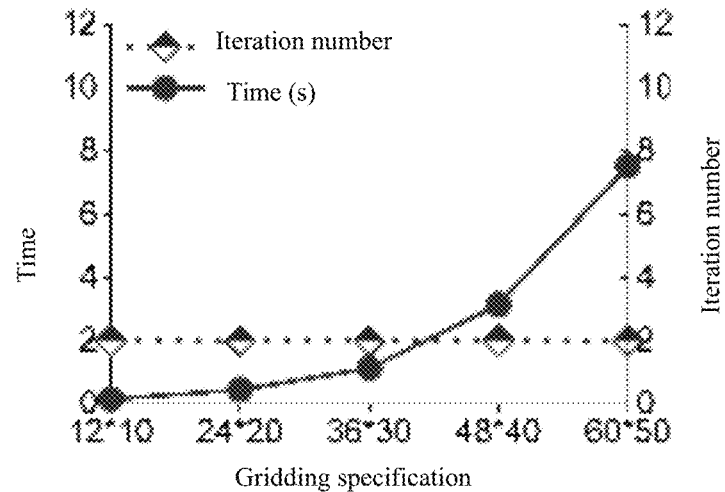
Figure 8D:
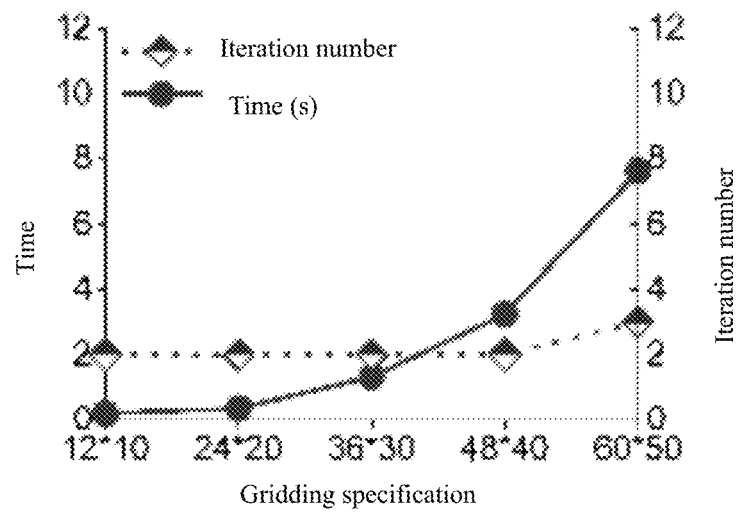
Figure 9A:
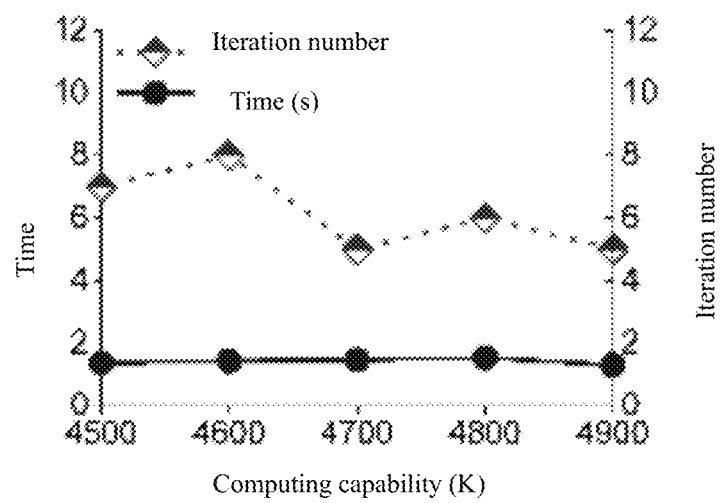
FIGS. 9A-9D are curve graphs illustrating effects of computing capabilities on a computing time and a number of times of iteration in sub-problems of SKSW, SKIW, IKSW and IKIW according to an example of the present disclosure.
Figure 9B:
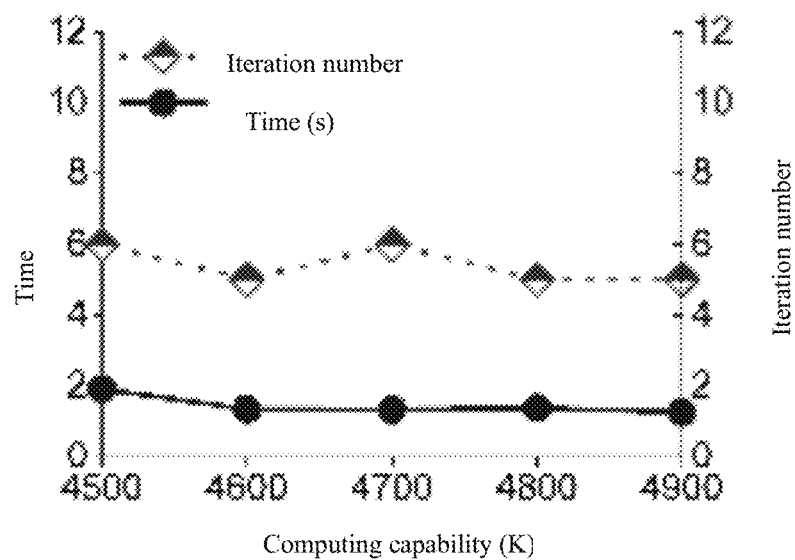
Figure 9C:
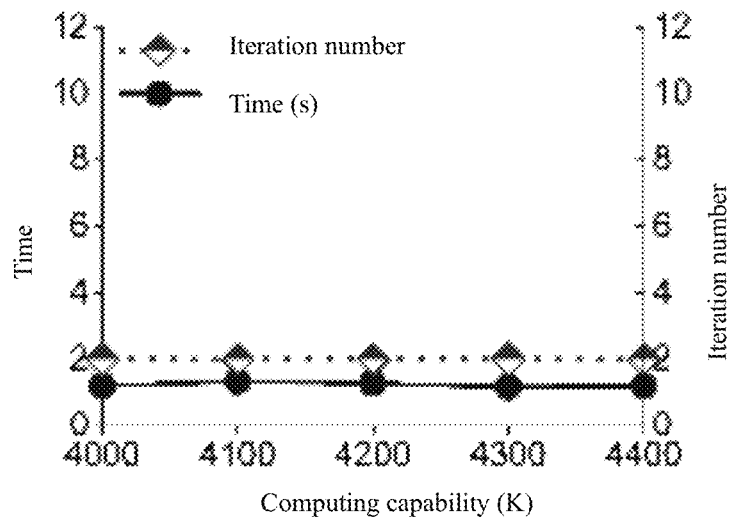
Figure 9D:
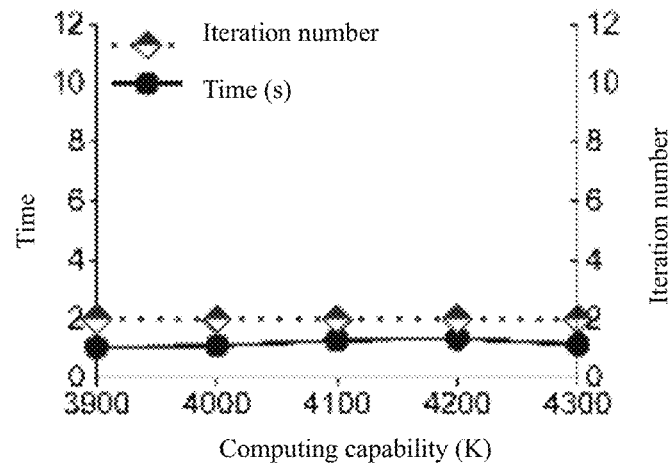

Setting of experimental data: an order data set of taxi users using Didi in Chengdu City is used. To satisfy general adaptability of the data set, data of one day is extracted every five days from July 2017 to May 2018, and urban areas are divided based on longitude and latitude. Then, an experiment is performed on a city order data map. A distribution of user orders is described by a heat map, as shown in FIG. 7. Obviously, the orders are concentrated in the middle part of the city, showing a downward trend. In FIG. 7, changes of user orders along with longitude and latitude are also displayed through a bar chart with a horizontal axis and a vertical axis respectively.

Setting of the hybrid edge computing environment: in the following three steps, the AP and the hybrid edge server are deployed and the experimental data is set.

Gridding: given one urban order request data map within the range of a longitude and a latitude, the map is divided into grids with different specifications, and five different size standards (for example, 12*10, 24*20, 36*30, 48*40 and 60*50) are formed. In the standards, 12*10 means that the latitude range is cut into 12 segments, and the longitude range is cut into 10 segments, so that 120 grids of the same size are finally obtained. The rest can be made by referring to this method.

Position selection: a central coordinate of each grid is selected as the position of each AP, and the position of the hybrid edge server is selected according to the number of requests contained in each grid. This means that the hybrid edge server is often placed in a region with dense population or more requests. Therefore, some regions with most requests are selected for deployment.

Data pre-processing: based on the coordinate of the user order, each user order is defined as a position requesting a service and giving a request. Currently, the requests in the metropolitan area network, all data of APs and hybrid edge servers may be obtained. An average distance reaching the user request of the local AP in each grid is computed as a communication delay from each user to the AP, and uniform distribution of straight-line distances between the APs of each pair is computed as a communication delay therebetween. Further, ten times of a maximum distance between APs is considered as a fixed remote scheduling delay. Finally, the average order number generated in each grid every day is computed as the number of local requests of each AP without loss of generality.

Parameter data used in an experiment is displayed in Table 2 through setting of the above experiment.

TABLE 2

| | Parameter | Setting | | | | |
|---|---|---|---|---|---|---|
| Communication network in the WMAN | Latitude | [30.57, 30.78] | | | | |
| | Longitude | [103.96, 104.17] | | | | |
| | α | 0.3 | | | | |
| | β | 0.1 | | | | |
| | Local communication delay | Average distance between the local request and the AP | | | | |
| | Communication delay between APs | 80%-120% of the average distance between APs | | | | |
| | Remote communication delay | 10 times of the maximum distance between APs | | | | |
| Network specification | Gridding specification | 12 * 20 | 24 * 20 | 36 * 30 | 48 * 40 | 60 * 50 |
| | Number of APs | 120 | 480 | 1080 | 1920 | 3000 |
| | Number of hybrid edge servers | 40 | 60 | 80 | 100 | 120 |

Design of the experiment is described below.

When the sub-problem model is solved by the request scheduling method according to the present disclosure, the MILP problem is solved by a Branch and Bound (BnB) method. Actually, the branch and bound method is a heuristic algorithm for solving an integer programming problem. As shown in FIGS. 8A-8D and FIGS. 9A-9D, two groups of experiments are performed below.

Effects of the grid specifications on the computing time and the number of times of iteration: as shown in FIGS. 8A-8D, four sub-problems under different regional division sizes are tested to obtain the optimal solution and record the number of times of iteration and the computing time of achieving the optimal solution.

Effects of the computing capabilities on the computing time and the number of times of iteration: as shown in FIGS. 9A-9D, four sub-problems under different computing capabilities (K) are tested to obtain the optimal solution and record the number of times of iteration and the computing time of achieving the optimal solution.

Five computations are performed for each group of experiments to obtain the final average computing time, and give final results in FIGS. 8A-8D and FIGS. 9A-9D.

FIGS. 8A-8D illustrate how the computing time and the number of times of iteration required for computing the optimal solution are affected by the gridding of different sub-problems. In this group of experiments, the value of the computing capability (K) is determined according to the total number of user requests and hybrid edge servers. In addition, the experiment is controlled through the communication capability.

In FIGS. 9A-9D, the division size is set to 36*30, and how the computing time and the number of times of iteration are affected by the computing capabilities (K) of different sub-problems is determined. The results are recorded based on the adjustment of the K value. For each sub-problem, it is necessary to pre-compute an upper limit and a lower limit of the K value according to the constraint of the sub-problem and the total number of user requests and servers.

According to a trend of solid lines in four sub-graphs of FIGS. 8A-8D, it can be known that the computing time increases with the increase of a data size. According to a trend of solid lines in four sub-graphs of FIGS. 9A-9D, it can be known that the computing capability (K) hardly affects the computing time. No matter how the data size and the computing capability of the hybrid edge server change, the optimal solution of the sub-problem model may still be found within a very short time. Actually, it takes no more than 9 seconds at most in 20 experiments of FIGS. 8A-8D, and it takes no more than 2 seconds at most in those of FIGS. 9A-9D. In these two groups of comparison experiments, the method of the present disclosure obtains the optimal solution by performing at most 10 iterations. This means that the branch and bound method can rapidly and effectively search for the optimal solution of the sub-problem. Therefore, the optimal solution is finally obtained with lower complexity by dividing the original ORS-HESP problem into four sub-problems and using the branch and bound method.

It can be easily seen from an analysis and a summary of the above experimental results that the request scheduling method of the present disclosure operates well. Since the computing time of large-scale operations is still very short, it proves that the request scheduling method of the present disclosure may solve the ORS-HESP problem very effectively. Experimental results show that the algorithm may control the number of times of iteration to a certain degree, greatly lowering the complexity of the problem. It also proves that the algorithm has very good expandability.

Figure 10:
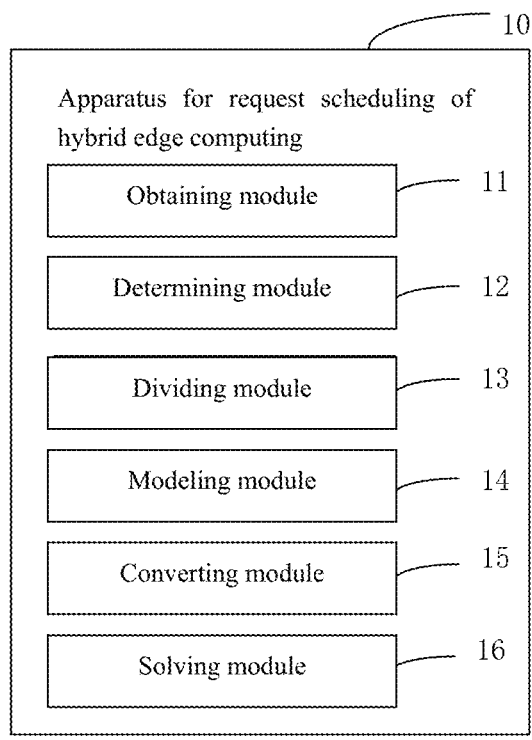
FIG. 10 is a block diagram illustrating an apparatus for request scheduling of hybrid edge computing according to an example of the present disclosure.

FIG. 10 is a block diagram illustrating an apparatus for request scheduling of hybrid edge computing according to an example of the present disclosure. As shown in FIG. 10, the apparatus 10 includes the following modules.

An obtaining module 11 is configured to obtain circumstances of a topological structure, computing resources and communication resources of a communication network.

A determining module 12 is configured to determine the number of hybrid edge servers placed in the communication network, where the hybrid edge server is a server providing services by using public resources and private resources.

A dividing module 13 is configured to divide a problem of an optimal request scheduling path of the hybrid edge server into sub-problems of Mixed-Integer Non-Linear Programming (MINLP) model according to the circumstances of the topological structure, the number, the computing resources and communication resources of the network, where the problem of the optimal request scheduling path of the hybrid edge server is used to determine a placement node of the hybrid edge server and a target server for processing communication requests when requirements of a minimum total communication delay and a maximum number of the processed communication requests in the communication network are satisfied, and the sub-problem includes any of the followings:

a sub-problem of sufficient computing resources and sufficient communication resources, a sub-problem of insufficient computing resources and sufficient communication resources, a sub-problem of sufficient computing resources and insufficient communication resources and a sub-problem of insufficient computing resources and insufficient communication resources.

A modeling module 14 is configured to establish the MINLP model according to the sub-problems respectively.

A converting module 15 is configured to convert the MINLP model into a Mixed-Integer Linear Programming (MILP) equation.

A solving module 16 is configured to solve the MILP equation to obtain the placement node of the hybrid edge server and the target server for processing the communication requests.

In an implementation, in a case of the sufficient computing resources and the sufficient communication resources, the modeling module is configured to establish the MINLP model according to the sub-problem as follows:

$$\min \sum_{i=1}^{n} \pi_i \theta_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \leq \lfloor \alpha K \rfloor, \forall x_i = 1$$

$$i, j \in \{1, 2, \ldots, n\}$$

$$\sum_{j=1}^{n} y_{j,i} \leq \lfloor (1-\alpha)K \rfloor, \forall x_i = 1$$

$$\sum_{j=1}^{n} y_{i,j} \leq \lfloor (1-\beta)\theta_i \rfloor, \forall x_i = 1$$

$$\sum_{x_j=1} y_{i,j} \leq \lfloor \theta_i \rfloor, \forall x_i = 0$$

$$\theta_i \leq W, \forall i \in \{1, 2, \ldots, n\}.$$

In the above equations, n refers to the total number of access points, i and j refer to access point indexes, $\pi_i$ refers to a fixed communication delay between AP $\upsilon_i$ and a local user request, AP $\upsilon_i$ refers to a hybrid edge server of an i-th access point, $\theta_i$ refers to the number of local user requests of AP $\upsilon_i$, m refers to the total number of hybrid edge servers, $\xi_{i,j}$ refers to a communication delay of scheduling a request from AP $\upsilon_i$ to AP $\upsilon_j$, AP $\upsilon_j$ refers to a hybrid edge server of a j-th access point, $y_{i,j}$ refers to the number of requests scheduled from AP $\upsilon_i$ to AP $\upsilon_j$ with having an edge server locally, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server, K refers to a computing capability of the hybrid edge server, and W refers to a communication capability of the hybrid edge server.

In an implementation, in a case of the insufficient computing resources and the sufficient communication resources, the modeling module is configured to establish the MINLP model according to the sub-problem as follows:

$$\min \sum_{i=1}^{n} \lambda \zeta_i + \sum_{i=1}^{n} \pi_i \theta_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \leq \lfloor \alpha K \rfloor, \forall x_i = 1$$

$$i, j \in \{1, 2, \ldots, n\}$$

$$\zeta_i = \max\left\{0, \sum_{j=1}^{n} y_{j,i} - \lfloor (1-\alpha)K \rfloor\right\}$$

$$\sum_{j=1}^{n} y_{j,i} > \lfloor (1-\alpha)K \rfloor, \exists i \in \{i \mid x_i = 1, i = 1, 2, \ldots, n\}$$

$$\sum_{x_j=1} y_{i,j} \leq \lfloor (1-\beta)\theta_i \rfloor, \forall x_i = 1$$

$$\sum_{x_j=1} y_{i,j} \leq \lfloor \theta_i \rfloor, \forall x_i = 0$$

$$\sum_{i=1}^{n} \sum_{x_j=1} y_{i,j} + \zeta_i = \sum_{i=1}^{n} \lfloor (1-\beta)\theta_i \rfloor - \sum_{x_j=1} \lfloor (1-\alpha)K \rfloor,$$

$$\forall i \in \{1, 2, \ldots, n\}$$

$$\theta_i \leq W, \forall i \in \{1, 2, \ldots, n\}.$$

In the above equations, i and j refer to of access point indexes, n refers to the total number of access points, $\lambda$ refers to a communication delay between any hybrid edge server in the communication network and a data center cloud, $\zeta_i$ refers to the number of requests offloaded from AP $\upsilon_i$ to the data center cloud, $\pi_i$ refers to a fixed communication delay between AP $\upsilon_i$ and a local user request, $\theta_1$ refers to the number of local user requests of AP $\upsilon_i$, $\xi_{i,j}$ refers to a communication delay of scheduling a request from AP $\upsilon_i$ to AP $\upsilon_j$, $y_{i,j}$ refers to the number of requests scheduled from AP $\upsilon_i$ to AP $\upsilon_j$ with having an edge server locally, m refers to the total number of hybrid edge servers, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server, K refers to a computing capability of the hybrid edge server, W refers to a communication capability of the hybrid edge server, AP $\upsilon_i$ refers to a hybrid edge server of an i-th access point, and AP $\upsilon_j$ refers to a hybrid edge server of a j-th access point.

The apparatus in the above example is used to implement the corresponding method in the above example, and has beneficial effects of the corresponding method example, which is not described in detail herein.

Those of ordinary skill in the art should understand that discussions of any of the above examples are merely exemplary, and are not intended to imply that the scope (including claims) of the present disclosure is limited to these examples. In the spirit of the present disclosure, technical features in the above examples or different examples may also be combined blocks may be implemented in any order, and many other changes in different aspects of the present disclosure as described above may exist, which are not provided in detail for simplicity.

In addition, to simplify descriptions and discussions and to understand the present disclosure easily, well-known power source/grounding connections with integrated circuit (IC) chips and other components may be or may not be illustrated in the provided drawings. In addition, the apparatus may be illustrated in a form of a block diagram to facilitate easy understanding of the present disclosure. Further, the following facts are also considered, that is, details about implementations of these apparatuses in the form of block diagrams are highly dependent on platforms for implementing the present disclosure (that is, these details are completely within the understanding scope of those skilled in the art). In the case that the specific details (for example, circuits) are set forth to describe the examples of the present disclosure, it is apparent that those skilled in the art may implement the present disclosure in the case of no these specific details or in the case that these specific details are changed. Therefore, these descriptions are to be considered as illustrative rather than limiting Although the present disclosure is already described in combination with the specific examples of the present disclosure, many substitutions, modifications and variations of these examples are apparent to those of ordinary skill in the art according to the above descriptions. For example, the discussed examples may be applied to other memory architectures (e.g., a Dynamic Random Access Memory (DRAM)).

The examples of the present disclosure are intended to include all such substitutions, modifications and variations falling in the broad scope of the appended claims. Therefore, any omissions, modifications, equivalent substitutions, improvements and the like made within the spirit and principles of the present disclosure shall be encompassed in the scope of protection of the present disclosure.

What is claimed is:

1. A method of request scheduling of hybrid edge computing, comprising:
    obtaining circumstances of a topological structure, computing resources and communication resources of a communication network;
    determining the number of hybrid edge servers placed in the communication network, wherein the hybrid edge server is a server providing services by using public resources and private resources;
    dividing a problem of an optimal request scheduling path of the hybrid edge server into sub-problems of Mixed-Integer Non-Linear Programming (MINLP) model according to the circumstances of the topological structure, the number, the computing resources and the communication resources of the network, wherein the problem of the optimal request scheduling path of the hybrid edge server is used to determine a placement node of the hybrid edge server and a target server for processing communication requests when requirements of a minimum total communication delay and a maximum number of the processed communication requests in the communication network are satisfied, and the sub-problem comprises any of the followings:
    a sub-problem of sufficient computing resources and sufficient communication resources, a sub-problem of insufficient computing resources and sufficient communication resources, a sub-problem of sufficient computing resources and insufficient communication resources and a sub-problem of insufficient computing resources and insufficient communication resources;
    establishing the MINLP model according to the sub-problems respectively;
    converting the MINLP model into a Mixed-Integer Linear Programming (MILP) equation; and
    solving the MILP equation to obtain the placement node of the hybrid edge server and the target server for processing the communication requests.

2. The method according to claim 1, wherein in a case of the sufficient computing resources and the sufficient communication resources, the MINLP model is established according to the sub-problem as follows:

$$\min \sum_{i=1}^{n} \pi_i \theta_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \leq \lfloor \alpha K \rfloor, \forall x_i = 1$$

$$i, j \in \{1, 2, \ldots, n\}$$

$$\sum_{j=1}^{n} y_{j,i} \leq \lfloor (1-\alpha) K \rfloor, \forall x_i = 1$$

$$\sum_{j=1}^{n} y_{j,i} \leq \lfloor (1-\beta)\theta_i \rfloor, \forall x_i = 1$$

$$\sum_{x_j=1} y_{i,j} = \lfloor \theta_i \rfloor, \forall x_i = 0$$

$$\theta_i \leq W, \forall i \in \{1, 2, \ldots, n\},$$

wherein n refers to the total number of access points, i and j refer to access point indexes, $\pi_i$ refers to a fixed communication delay between AP $\upsilon_i$ and a local user request, AP $\upsilon_i$ refers to a hybrid edge server of an i-th access point, $\theta_i$ refers to the number of local user requests of AP $\upsilon_i$, m refers to the total number of hybrid edge servers, $\xi_{i,j}$ refers to a communication delay of scheduling a request from AP $\upsilon_i$ to AP $\upsilon_j$, AP $\upsilon_j$ refers to a hybrid edge server of a j-th access point, $y_{i,j}$ refers to the number of requests scheduled from AP $\upsilon_i$ to AP $\upsilon \upsilon_j$ having an edge server locally, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server, K refers to a computing capability of the hybrid edge server, and W refers to a communication capability of the hybrid edge server.

3. The method according to claim 1, wherein in a case of the insufficient computing resources and the sufficient communication resources, the MINLP model is established according to the sub-problem as follows:

$$\min \sum_{i=1}^{n} \lambda \xi_i + \sum_{i=1}^{n} \pi_i \theta_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \leq \lfloor \alpha K \rfloor, \forall x_i = 1$$

$$i, j \in \{1, 2, \ldots, n\}$$

-continued $$\zeta_i = \max\left\{0, \sum_{j=1}^{n} y_{j,i} - \lfloor(1-\alpha)K\rfloor\right\}$$

$$\sum_{j=1}^{n} y_{j,i} > \lfloor(1-\alpha)K\rfloor, \exists i \in \{i \mid x_i = 1, i = 1, 2, \ldots, n\}$$

$$\sum_{x_j=1} y_{i,j} \leq \lfloor(1-\beta)\theta_i\rfloor, \forall x_i = 1$$

$$\sum_{x_j=1} y_{i,j} \leq \lfloor\theta_i\rfloor, \forall x_i = 0$$

$$\sum_{i=1}^{n}\sum_{x_j=1} y_{i,j} + \zeta_i = \sum_{i=1}^{n}\lfloor(1-\beta)\theta_i\rfloor - \sum_{x_j=1}\lfloor(1-\alpha)K\rfloor,$$

$$\forall i \in \{1, 2, \ldots, n\}$$

$$\theta_i \leq W, \forall i \in \{1, 2, \ldots, n\}.$$

wherein i and j refer to access point indexes, n refers to the total number of access points, $\lambda$ refers to a communication delay between any hybrid edge server in the communication network and a data center cloud, $\zeta_i$ refers to the number of requests offloaded from AP $\upsilon_i$ to the data center cloud, $\pi_i$ refers to a fixed communication delay between AP $\upsilon_i$ and a local user request, $\theta_i$ refers to the number of local user requests of AP $\upsilon_i$, $\xi_{i,j}$ refers to a communication delay of scheduling a request from AP $\upsilon_i$ to AP $\upsilon_j$, $y_{i,j}$ refers to the number of requests scheduled from AP $\upsilon_i$ to AP $\upsilon_j$ having an edge server locally, m refers to the total number of hybrid edge servers, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server, K refers to a computing capability of the hybrid edge server, W refers to a communication capability of the hybrid edge server, AP $\upsilon_i$ refers to a hybrid edge server of an i-th access point, and AP $\upsilon_j$ refers to a hybrid edge server of a j-th access point.

4. The method according to claim 1, wherein when in a case of the sufficient computing resources and the insufficient communication resources, the MINLP model is established according to the sub-problem as follows:

$$\min \sum_{i=1}^{n} \pi_i \chi_i + \sum_{i=1}^{n}\sum_{j=1}^{n} \xi_{i,j} y_{i,j}$$

s.t.

$$\sum_{i=1}^{n} x_i = m, x_i \in \{0, 1\}$$

$$\lfloor\beta\theta_i\rfloor \leq \lfloor\alpha K\rfloor, \forall x_i = 1$$

$$\sum_{x_j=1} y_{i,j} = \lfloor\chi_i - \beta\theta_i\rfloor, \forall x_i = 1$$

$$\sum_{x_j=1} y_{i,j} = \lfloor\chi_i\rfloor, \forall x_i = 0$$

$$\chi_i = \min\{\theta_i, W\}$$

$$i, j \in \{1, 2, \ldots, n\}$$

$$\sum_{j=1}^{n} y_{j,i} \leq \lfloor(1-\alpha)K\rfloor, \forall x_i = 1$$

$$\theta_i > W, \exists i \in \{1, 2, \ldots, n\}.$$

Wherein i and j refer to access point indexes, n refers to the total number of access points, $\pi_i$ refers to a fixed communication delay between AP $\upsilon_i$ and a local user request, $\chi_i$ refers to the number of requests in communication near AP $\upsilon_i$, $\theta_i$ refers to the number of local user requests of AP $\upsilon_i$, $\xi_{i,j}$ refers to a communication delay of scheduling a request from AP $\upsilon_i$ to AP $\upsilon_j$, $y_{i,j}$ refers to the number of requests scheduled from AP $\upsilon_i$ to AP $\upsilon_j$ having an edge server locally, m refers to the total number of hybrid edge servers, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server, K refers to a computing capability of the hybrid edge server, W refers to a communication capability of the hybrid edge server, AP $\upsilon_i$ refers to a hybrid edge server of an i-th access point, and AP $\upsilon_j$ refers to a hybrid edge server of a j-th access point.

5. The method according to claim 1, wherein in a case of the insufficient computing resources and the insufficient communication resources, the MINLP model is established according to the sub-problem as follows:

$$\min \sum_{i=1}^{n} \lambda\zeta_i + \sum_{i=1}^{n} \pi_i\chi_i + \sum_{i=1}^{n}\sum_{j=1}^{n} \xi_{i,j} y_{i,j}$$

s.t.

$$\sum_{i=1}^{n} x_i = m, x_i \in \{0, 1\}$$

$$\lfloor\beta\theta_i\rfloor \leq \lfloor\alpha K\rfloor, \forall x_i = 1$$

$$\zeta_i = \max\left\{0, \sum_{j=1}^{n} y_{j,i} - \lfloor(1-\alpha)K\rfloor\right\}$$

$$\chi_i = \min\{\theta_i, W\}$$

$$i, j \in \{1, 2, \ldots, n\}$$

$$\sum_{j=1}^{n} y_{j,i} > \lfloor(1-\alpha)K\rfloor, \exists i \in \{i \mid x_i = 1, i = 1, 2, \ldots, n\}$$

$$\theta_i > W, \exists i \in \{1, 2, \ldots, n\}$$

$$\sum_{x_j=1} y_{i,j} \leq \lfloor\chi_i - \beta\theta_i\rfloor, \forall x_i = 1$$

$$\sum_{x_j=1} y_{i,j} \leq \lfloor\chi_i\rfloor, \forall x_i = 0$$

$$\sum_{i=1}^{n}\sum_{x_j=1} y_{i,j} = \sum_{i=1}^{n}\lfloor(1-\beta)\theta_i\rfloor - \sum_{x_j=1}\lfloor(1-\alpha)K\rfloor,$$

$$\forall i \in \{1, 2, \ldots, n\},$$

wherein n refers to the total number of access points, $\lambda$ refers to a communication delay between any hybrid edge server in the communication network and a data center cloud, $\zeta_i$ refers to the number of requests from AP $\upsilon_i$ offloaded to the data center cloud, i and j refer to of access point indexes, m refers to the total number of hybrid edge servers, $\pi_i$ refers to a fixed communication delay between AP $\upsilon_i$ and a local user request, $\theta_i$ refers

27 to the number of local user requests of AP $\upsilon_i$, $\xi_{i,j}$ refers to a communication delay of scheduling a request from AP $\upsilon_i$ to AP $\upsilon J$, $y_{i,j}$ refers to the number of requests scheduled from AP $\upsilon_i$ to AP $\upsilon_j$ having an edge server locally, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server, K refers to a computing capability of the hybrid edge server, $\chi_i$ refers to the number of requests in communication near AP $\upsilon_i$, W refers to a communication capability of the hybrid edge server, AP $\upsilon_i$ refers to a hybrid edge server of an i-th access point, and AP $\upsilon_j$ refers to a hybrid edge server of a j-th access point.

6. An electronic device, comprising a memory, a processor and computer programs that are stored on the memory and executable by the processor, wherein the processor executes the programs to implement the method of request scheduling of hybrid edge computing according to claim 1.

7. A non-transitory computer readable storage medium storing computer instructions, wherein the computer instructions are configured to cause a computer to perform the method of request scheduling of hybrid edge computing according to claim 1.

8. The non-transitory computer readable storage medium storing computer instructions according to claim 7, wherein in a case of the sufficient computing resources and the sufficient communication resources, the MINLP model is established according to the sub-problem as follows:

$$\min \sum_{i=1}^{n} \pi_i \theta_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \le \lfloor \alpha K \rfloor, \forall x_i = 1$$

$$i, j \in \{1, 2, \ldots, n\}$$

$$\sum_{j=1}^{n} y_{j,i} \le \lfloor (1-\alpha)K \rfloor, \forall x_i = 1$$

$$\sum_{j=1}^{n} y_{i,j} \le \lfloor (1-\beta)\theta_i \rfloor, \forall x_i = 1$$

$$\sum_{x_j=1} y_{i,j} = \lfloor \theta_i \rfloor, \forall x_i = 0$$

$$\theta_i \le W, \forall i \in \{1, 2, \ldots, n\},$$

wherein n refers to the total number of access points, i and j refer to access point indexes, $\pi_i$ refers to a fixed communication delay between AP $\upsilon_i$ and a local user request, AP $\upsilon_i$ refers to a hybrid edge server of an i-th access point, $\theta_i$ refers to the number of local user requests of AP $\upsilon_i$, m refers to the total number of hybrid edge servers, $\xi_{i,j}$ refers to a communication delay of scheduling a request from AP $\upsilon_i$ to AP $\upsilon_j$, AP $\upsilon_j$ refers to a hybrid edge server of a j-th access point, $y_{i,j}$ refers to the number of requests scheduled from AP $\upsilon_i$ to AP $\upsilon_j$ having an edge server locally, $x_i$ refers to an indicative function value about whether there is a hybrid edge server near AP $\upsilon_i$, $\beta$ refers to a ratio of private requests

28 near the access point, $\alpha$ refers to a ratio of private resources in the hybrid edge server, K refers to a computing capability of the hybrid edge server, and W refers to a communication capability of the hybrid edge server.

9. The non-transitory computer readable storage medium storing computer instructions according to claim 7, wherein in a case of the insufficient computing resources and the sufficient communication resources, the MINLP model is established according to the sub-problem as follows:

$$\min \sum_{i=1}^{n} \lambda \zeta_i + \sum_{i=1}^{n} \pi_i \theta_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \le \lfloor \alpha K \rfloor, \forall x_i = 1$$

$$i, j \in \{1, 2, \ldots, n\}$$

$$\zeta_i = \max\left\{0, \sum_{j=1}^{n} y_{j,i} - \lfloor (1-\alpha)K \rfloor\right\}$$

$$\sum_{j=1}^{n} y_{j,i} > \lfloor (1-\alpha)K \rfloor, \exists i \in \{i \mid x_i = 1, i = 1, 2, \ldots, n\}$$

$$\sum_{x_j=1} y_{i,j} \le \lfloor (1-\beta)\theta_i \rfloor, \forall x_i = 1$$

$$\sum_{x_j=1} y_{i,j} \le \lfloor \theta_i \rfloor, \forall x_i = 0$$

$$\sum_{i=1}^{n} \sum_{x_j=1} y_{i,j} + \zeta_i = \sum_{i=1}^{n} \lfloor (1-\beta)\theta_i \rfloor - \sum_{x_j=1} \lfloor (1-\alpha)K \rfloor,$$

$$\forall i \in \{1, 2, \ldots, n\}$$

$$\theta_i \le W, \forall i \in \{1, 2, \ldots, n\},$$

wherein i and j refer to access point indexes, n refers to the total number of access points, $\lambda$ refers to a communication delay between any hybrid edge server in the communication network and a data center cloud, $\zeta_i$ refers to the number of requests offloaded from AP $\upsilon_i$ to the data center cloud, $\pi_i$ refers to a fixed communication delay between AP $\upsilon_i$ and a local user request, $\theta_i$ refers to the number of local user requests of AP $\upsilon_i$, $\xi_{i,j}$ refers to a communication delay of scheduling a request from AP $\upsilon_i$ to AP $\upsilon_j$, $y_{i,j}$ refers to the number of requests scheduled from AP $\upsilon_i$ to AP $\upsilon_j$ having an edge server locally, m refers to the total number of hybrid edge servers, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server, K refers to a computing capability of the hybrid edge server, W refers to a communication capability of the hybrid edge server, AP $\upsilon_i$ refers to a hybrid edge server of an i-th access point, and AP $\upsilon_j$ refers to a hybrid edge server of a j-th access point.

10. The non-transitory computer readable storage medium storing computer instructions according to claim 7, wherein when in a case of the sufficient computing resources and the insufficient communication resources, the MINLP model is established according to the sub-problem as follows:

$$\min \sum_{i=1}^{n} \pi_i \chi_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \le \lfloor \alpha K \rfloor, \forall x_i = 1$$

$$\sum_{x_j=1} y_{i,j} = \lfloor \chi_i - \beta \theta_i \rfloor, \forall x_i = 1$$

$$\sum_{x_j=1} y_{i,j} = \lfloor \chi_i \rfloor, \forall x_i = 0$$

$$\chi_i = \min\{\theta_i, W\}$$

$$i, j \in \{1, 2, \ldots, n\}$$

$$\sum_{j=1}^{n} y_{j,i} \le \lfloor (1-\alpha)K \rfloor, \forall x_i = 1$$

$$\theta_i > W, \exists i \in \{1, 2, \ldots, n\},$$

Wherein i and j refer to access point indexes, n refers to the total number of access points, $\pi_i$ refers to a fixed communication delay between AP $\upsilon_i$ and a local user request, $\chi_i$ refers to the number of requests in communication near AP $\upsilon_i$, $\theta_i$ refers to the number of local user requests of AP $\upsilon_i$, $\xi_{i,j}$ refers to a communication delay of scheduling a request from AP $\upsilon_i$ to AP $\upsilon_j$, $y_{i,j}$ refers to the number of requests scheduled from AP $\upsilon_i$ to AP $\upsilon_j$ having an edge server locally, m refers to the total number of hybrid edge servers, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server, K refers to a computing capability of the hybrid edge server, W refers to a communication capability of the hybrid edge server, AP $\upsilon_i$ refers to a hybrid edge server of an i-th access point, and AP $\upsilon_j$ refers to a hybrid edge server of a j-th access point.

11. The non-transitory computer readable storage medium storing computer instructions according to claim 7, wherein in a case of the insufficient computing resources and the insufficient communication resources, the MINLP model is established according to the sub-problem as follows:

$$\min \sum_{i=1}^{n} \lambda \zeta_i + \sum_{i=1}^{n} \pi_i \chi_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \le \lfloor \alpha K \rfloor, \forall x_i = 1$$

$$\zeta_i = \max\left\{0, \sum_{j=1}^{n} y_{j,i} - \lfloor (1-\alpha)K \rfloor\right\}$$

$$\chi_i = \min\{\theta_i, W\}$$

$$i, j \in \{1, 2, \ldots, n\}$$

$$\sum_{j=1}^{n} y_{j,i} > \lfloor (1-\alpha)K \rfloor, \exists i \in \{i \mid x_i = 1, i = 1, 2, \ldots, n\}$$

$$\theta_i > W, \exists i \in \{1, 2, \ldots, n\}$$

$$\sum_{x_j=1} y_{i,j} \le \lfloor \chi_i - \beta \theta_i \rfloor, \forall x_i = 1$$

$$\sum_{x_j=1} y_{i,j} \le \lfloor \chi_i \rfloor, \forall x_i = 0$$

$$\sum_{i=1}^{n} \sum_{x_j=1} y_{i,j} = \sum_{i=1}^{n} \lfloor (1-\beta)\theta_i \rfloor - \sum_{x_j=1} \lfloor (1-\alpha)K \rfloor,$$

$$\forall i \in \{1, 2, \ldots, n\},$$

wherein n refers to the total number of access points, $\lambda$ refers to a communication delay between any hybrid edge server in the communication network and a data center cloud, $\zeta_i$ refers to the number of requests from AP $\upsilon_i$ offloaded to the data center cloud, i and j refer to of access point indexes, m refers to the total number of hybrid edge servers, $\pi_i$ refers to a fixed communication delay between AP $\upsilon_i$ and a local user request, $\theta_i$ refers to the number of local user requests of AP $\upsilon_i$, $\xi_{i,j}$ refers to a communication delay of scheduling a request from AP $\upsilon_i$ to AP $\upsilon_j$, $y_{i,j}$ refers to the number of requests scheduled from AP $\upsilon_i$ to AP $\upsilon_j$ having an edge server locally, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server, K refers to a computing capability of the hybrid edge server, $\chi_i$ refers to the number of requests in communication near AP $\upsilon_i$, W refers to a communication capability of the hybrid edge server, AP $\upsilon_i$ refers to a hybrid edge server of an i-th access point, and AP $\upsilon_j$ refers to a hybrid edge server of a j-th access point.

12. An apparatus for request scheduling of hybrid edge computing, comprising:
an obtaining module, configured to obtain situations of a topological structure, computing resources and communication resources of a communication network;
a determining module, configured to determine the number of hybrid edge servers placed in the communication network, wherein the hybrid edge server is a server providing services by using public resources and private resources;
a dividing module, configured to divide a problem of an optimal request scheduling path of the hybrid edge server into sub-problems of Mixed-Integer Non-Linear Programming (MINLP) model according to the situations of the topological structure, the number, the computing resources and the communication resources of the network, wherein the problem of the optimal request scheduling path of the hybrid edge server is used to determine a placement node of the hybrid edge server and a target server for processing communication requests when requirements of a minimum total communication delay and a maximum number of the processed communication requests in the communication network are satisfied, and the sub-problem comprises any of the followings:
a sub-problem of sufficient computing resources and sufficient communication resources, a sub-problem of insufficient computing resources and sufficient communication resources, a sub-problem of sufficient computing resources and insufficient communication resources and a sub-problem of insufficient computing resources and insufficient communication resources;
a modeling module, configured to establish the MINLP model according to the sub-problems respectively;
a converting module, configured to convert the MINLP model into a Mixed-Integer Linear Programming (MILP) equation; and
a solving module, configured to solve the MILP equation to obtain the placement node of the hybrid edge server and the target server for processing the communication requests.

13. The apparatus according to claim 12 wherein in a case of the sufficient computing resources and the sufficient communication resources, the modeling module is configured to establish the MINLP model according to the sub-problem as follows:

$$\min \sum_{i=1}^{n} \pi_i \theta_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \leq \lfloor \alpha K \rfloor, \forall x_i = 1$$

$$i, j \in \{1, 2, \ldots, n\}$$

$$\sum_{j=1}^{n} y_{j,i} \leq \lfloor (1-\alpha)K \rfloor, \forall x_i = 1$$

$$\sum_{j=1}^{n} y_{i,j} \leq \lfloor (1-\beta)\theta_i \rfloor, \forall x_i = 1$$

$$\sum_{x_j=1} y_{i,j} = \lfloor \theta_i \rfloor, \forall x_i = 0$$

$$\theta_i \leq W, \forall i \in \{1, 2, \ldots, n\}.$$

wherein n refers to the total number of access points, i and j refer to access point indexes, $\pi_i$ refers to a fixed communication delay between AP $\upsilon_i$ and a local user request, AP $\upsilon_i$ refers to a hybrid edge server of an i-th access point, $\theta_i$ refers to the number of local user requests of AP $\upsilon_i$, m refers to the total number of hybrid edge servers, $\xi_{i,j}$ refers to a communication delay of scheduling a request from AP $\upsilon_i$ to AP $\upsilon_j$, AP $\upsilon_j$ refers to a hybrid edge server of a j-th access point, $y_{i,j}$ refers to the number of requests scheduled from AP $\upsilon_i$ to AP $\upsilon_j$ having an edge server locally, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server, K refers to a computing capability of the hybrid edge server, and W refers to a communication capability of the hybrid edge server.

14. The apparatus according to claim 12, wherein in a case of the insufficient computing resources and the sufficient communication resources, the modeling module is configured to establish the MINLP model according to the sub-problem as follows:

$$\min \sum_{i=1}^{n} \lambda \zeta_i + \sum_{i=1}^{n} \pi_i \theta_i + \sum_{i=1}^{n} \sum_{j=1}^{n} \xi_{i,j} y_{i,j}$$

s.t.

$$\sum_{i=1}^{n} x_i = m, x_i \in \{0, 1\}$$

$$\lfloor \beta \theta_i \rfloor \leq \lfloor \alpha K \rfloor, \forall x_i = 1$$

$$i, j \in \{1, 2, \ldots, n\}$$

$$\zeta_i = \max\left\{0, \sum_{j=1}^{n} y_{j,i} - \lfloor (1-\alpha)K \rfloor\right\}$$

$$\sum_{j=1}^{n} y_{j,i} > \lfloor (1-\alpha)K \rfloor, \exists i \in \{i \mid x_i = 1, i = 1, 2, \ldots, n\}$$

$$\sum_{x_j=1} y_{i,j} \leq \lfloor (1-\beta)\theta_i \rfloor, \forall x_i = 1$$

$$\sum_{x_j=1} y_{i,j} \leq \lfloor \theta_i \rfloor, \forall x_i = 0$$

$$\sum_{i=1}^{n} \sum_{x_j=1} y_{i,j} + \zeta_i = \sum_{i=1}^{n} \lfloor (1-\beta)\theta_i \rfloor - \sum_{x_j=1} \lfloor (1-\alpha)K \rfloor,$$

$$\forall i \in \{1, 2, \ldots, n\}$$

$$\theta_i \leq W, \forall i \in \{1, 2, \ldots, n\},$$

wherein i and j refer to access point indexes, n refers to the total number of access points, $\lambda$ refers to a communication delay between any hybrid edge server in the communication network and a data center cloud, $\zeta_i$ refers to the number of requests offloaded from AP $\upsilon_i$ to the data center cloud, $\pi_i$ refers to a fixed communication delay between AP $\upsilon_i$ and a local user request, $\theta_i$ refers to the number of local user requests of AP $\upsilon_i$, $\xi_{i,j}$ refers to a communication delay of scheduling a request from AP $\upsilon_i$ to AP $\upsilon_j$, $y_{i,j}$ refers to the number of requests scheduled from AP $\upsilon_i$ to AP $\upsilon_j$ having an edge server locally, m refers to the total number of hybrid edge servers, $x_i$ refers to an indicative function value about whether there is a hybrid edge server near AP $\upsilon_i$, $\beta$ refers to a ratio of private requests near the access point, $\alpha$ refers to a ratio of private resources in the hybrid edge server, K refers to a computing capability of the hybrid edge server, W refers to a communication capability of the hybrid edge server, AP $\upsilon_i$ refers to a hybrid edge server of an i-th access point, and AP $\upsilon_j$ refers to a hybrid edge server of a j-th access point.

* * * * *